United States Patent
Cherkasova

(10) Patent No.: US 8,626,944 B2
(45) Date of Patent: *Jan. 7, 2014

(54) SYSTEM AND METHOD FOR EFFICIENT REPLICATION OF FILES

(75) Inventor: Ludmila Cherkasova, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 3065 days.

This patent is subject to a terminal disclaimer.

(21) Appl. No.: 10/429,797

(22) Filed: May 5, 2003

(65) Prior Publication Data

US 2004/0225723 A1 Nov. 11, 2004

(51) Int. Cl.
*G06F 15/16* (2006.01)
*G06F 15/173* (2006.01)

(52) U.S. Cl.
USPC ........... 709/236; 709/201; 709/238; 709/248; 709/252

(58) Field of Classification Search
USPC ......... 709/201, 203, 219, 231, 246, 236, 248, 709/252, 238; 707/10, 101, 104.1
See application file for complete search history.

(56) References Cited

U.S. PATENT DOCUMENTS

| | | | |
|---|---|---|---|
| 5,832,522 A | | 11/1998 | Blickenstaff et al. |
| 5,835,757 A | | 11/1998 | Oulid-Aissa et al. |
| 5,928,331 A | * | 7/1999 | Bushmitch ............... 709/231 |
| 5,963,944 A | | 10/1999 | Adams |
| 6,205,445 B1 | | 3/2001 | Tokuyama |
| 6,230,251 B1 | | 5/2001 | Batten et al. |
| 6,233,252 B1 | | 5/2001 | Barker et al. |
| 6,253,185 B1 | | 6/2001 | Arean et al. |
| 6,269,080 B1 | | 7/2001 | Kumar |
| 6,330,370 B2 | | 12/2001 | Goyal et al. |
| 6,345,125 B2 | | 2/2002 | Goyal et al. |
| 6,397,251 B1 | | 5/2002 | Graf |
| 6,405,219 B2 | | 6/2002 | Saether et al. |
| 6,449,688 B1 | * | 9/2002 | Peters et al. ............ 711/112 |
| 6,460,153 B1 | | 10/2002 | Chou et al. |
| 6,466,574 B1 | * | 10/2002 | Fujisaki et al. ............ 370/356 |
| 6,477,583 B1 | | 11/2002 | Zayas et al. |
| 6,493,877 B1 | | 12/2002 | Yamazaki et al. |
| 6,516,297 B1 | | 2/2003 | Servetto et al. |
| 6,772,337 B1 | | 8/2004 | Yener |

(Continued)

OTHER PUBLICATIONS

Cohen, Bram, BitTorrent Protocol Documentation, Apr. 2, 2003, http://web.archive.org/web/20030402081427/http://www.bitconjurer.org/BitTorrent/protocol.html, pp. 1-4.*

Byers, J. et al., "Informed Content Delivery Across Adaptive Overlay Networks," Proc. of ACM SIGCOMM, 2002, pp. 1-14.

(Continued)

*Primary Examiner* — Gregory Todd

(57) ABSTRACT

A method comprises distributing a plurality of descriptors of file encoded with comprising a plurality of recipient nodes, wherein at least one descriptor is distributed from the first node to each recipient node of the at least a portion of the first group. The at least a portion of the first group communicate their respective descriptors received from the first node to other nodes of the first group. A system comprises an origin node operable to distribute all of a plurality of descriptors of a MDC file to a first group of recipient nodes, wherein the origin node does not attempt to communicate all of the plurality of descriptors to all of the recipient nodes of the first group. The recipient nodes of the first group are each operable to communicate a descriptor that it receives from the origin node to other nodes of the first group.

38 Claims, 9 Drawing Sheets

(56) References Cited

U.S. PATENT DOCUMENTS

| | | | |
|---|---|---|---|
| 6,857,012 B2 | 2/2005 | Sim et al. | |
| 6,865,601 B1 | 3/2005 | Cherkasova et al. | |
| 6,925,499 B1 | 8/2005 | Chen et al. | |
| 6,970,939 B2 * | 11/2005 | Sim | 709/236 |
| 7,080,400 B1 | 7/2006 | Navar | |
| 7,174,334 B2 * | 2/2007 | Cherkasova | 707/10 |
| 7,200,598 B2 * | 4/2007 | Cherkasova | 707/10 |
| 7,792,982 B2 * | 9/2010 | Padmanabhan et al. | 709/231 |
| 2001/0040871 A1 | 11/2001 | Abrahamsson et al. | |
| 2002/0083118 A1 | 6/2002 | Sim | |
| 2002/0083187 A1 | 6/2002 | Sim et al. | |
| 2003/0007515 A1 | 1/2003 | Apostolopoulos et al. | |
| 2003/0009535 A1 | 1/2003 | Apostolopulos et al. | |
| 2003/0009578 A1 | 1/2003 | Apostolopoulos et al. | |
| 2003/0115340 A1 * | 6/2003 | Sagula et al. | 709/228 |
| 2004/0088380 A1 | 5/2004 | Chung et al. | |
| 2004/0179608 A1 * | 9/2004 | Holliman et al. | 375/240.25 |

OTHER PUBLICATIONS

Cherkasova et al~"FastReplica: Efficient Large File Distribution within Content Delivery Networks"~Proc USITS~2003~v 4~14 pages.

Cherkasova et al~"Improving Performance of Shared Web Hosting Service on a Web Server Cluster"~HP Labs Report HPL-1999-150 ~1999 ~2 pags.

Navathe et al~"Vertical partitioning Algorithms for Database Design"~ACM Transaction on Database Systerns~v 9 n4~Dec. 19984~pp. 680-710.

Sacca et al~"Database Partitioning in a Cluster of Processors"~Journal ACM Transactions in Database Systems~v 10 n 1~Mar. 1985~6 pages.

Scheuermann et al~"Data Partitioning and Load Balancing in parallell Disc Systems"~The VLDD Journal~1998~19 pages.

Yu et al~"Minimal Replication Cost for Availability"~Duke University/National Science Foundation~2002~pp. 10.

* cited by examiner

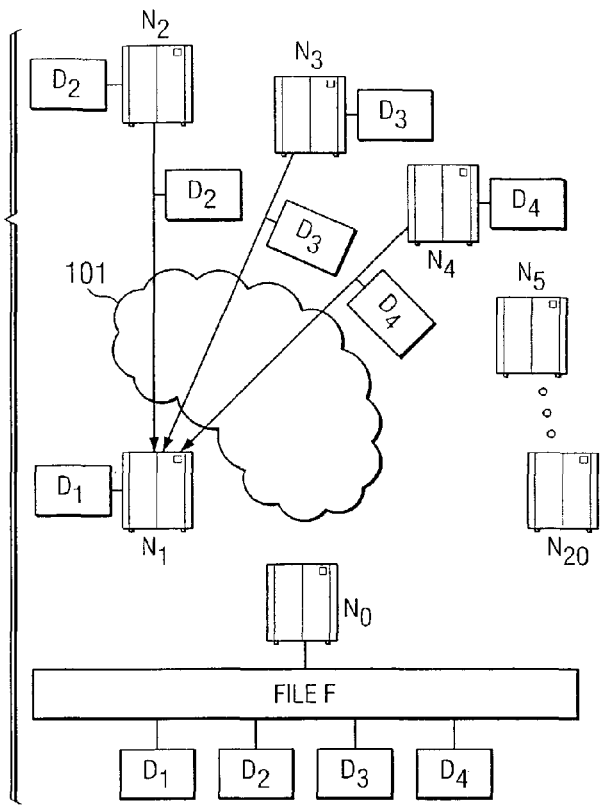
FIG. 4C
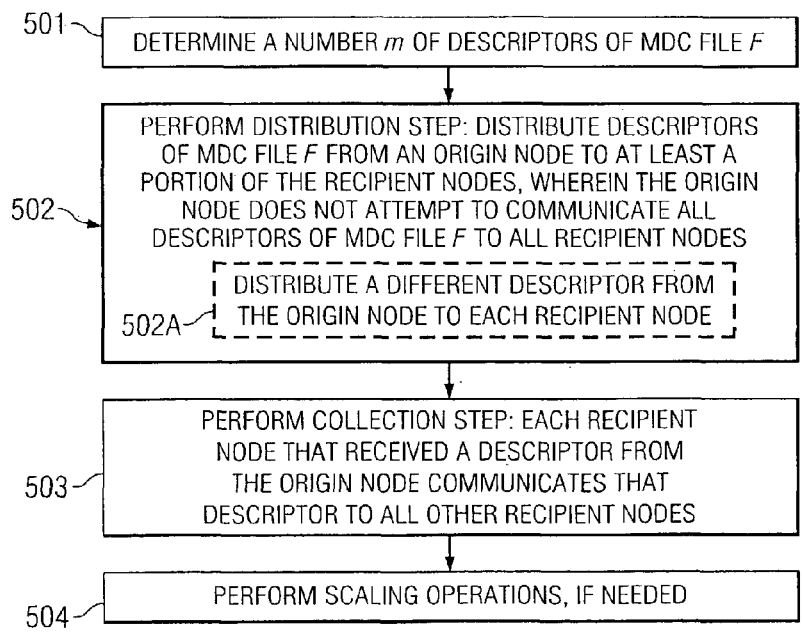

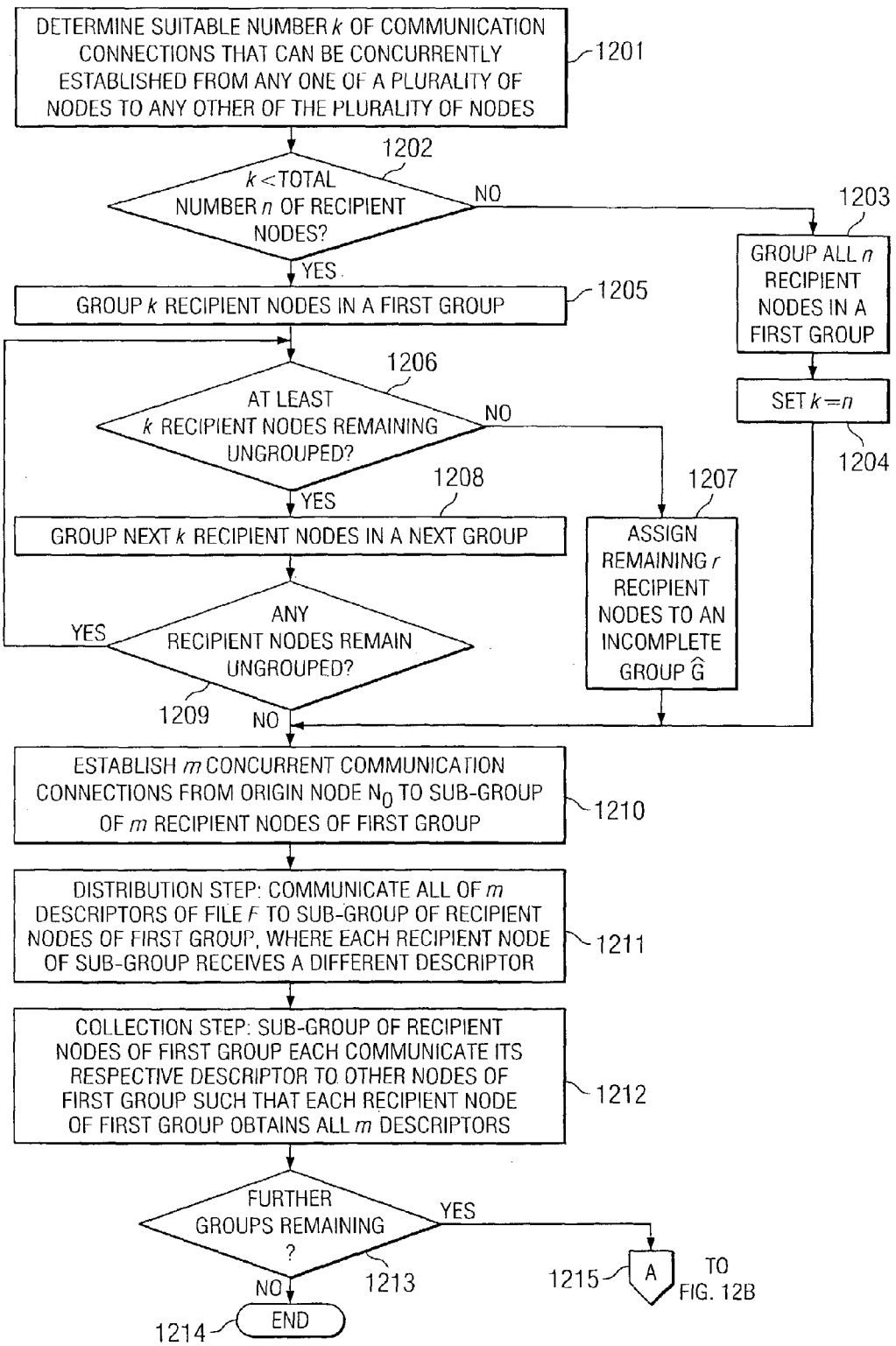

SYSTEM AND METHOD FOR EFFICIENT REPLICATION OF FILES

CROSS-REFERENCE TO RELATED APPLICATIONS

This application is related to and commonly assigned U.S. patent application Ser. No. 10/345,716, filed Jan. 16, 2003, titled "SYSTEM AND METHOD FOR EFFICIENTLY REPLICATING A FILE AMONG A PLURALITY OF RECIPIENTS" (now U.S. Pat. No. 7,174,334), and commonly assigned U.S. patent application Ser. No. 10/345,587, filed Jan. 16, 2003, titled "SYSTEM AND METHOD FOR EFFICIENTLY REPLICATING A FILE AMONG A PLURALITY OF RECIPIENTS IN A RELIABLE MANNER" (now U.S. Patent Application Publication No. 20040143647, and commonly assigned U.S. patent application Ser. No. 10/345,718, filed Jan. 16, 2003, titled "SYSTEM AND METHOD FOR EFFICIENTLY REPLICATING A FILE AMONG A PLURALITY OF RECIPIENTS HAVING IMPROVED SCALABILITY" (now U.S. Patent Application Publication No. 20040143576, and and commonly assigned U.S. patent application Ser. No. 10/345,719, filed Jan. 16, 2003, titled "SYSTEM AND METHOD FOR EFFICIENTLY REPLICATING A FILE AMONG A PLURALITY OF RECIPIENTS HAVING IMPROVED SCALABILITY AND RELIABILITY" (now U.S. Patent. Application Publication No. 20040143595, the disclosures of which are hereby incorporated herein by reference.

FIELD OF THE INVENTION

The present invention relates in general to file distribution, and more specifically to systems and methods for efficiently distributing a file that is encoded with multiple description coding.

DESCRIPTION OF RELATED ART

Today, much information is stored as digital data. Such information is often available to processor-based devices via client-server networks. Client-server networks are delivering a large array of information (including content and services) such as news, entertainment, personal shopping, airline reservations, rental car reservations, hotel reservations, on-line auctions, on-line banking, stock market trading, as well as many other services and types of content. Such information providers (sometimes referred to as "content providers") are making an ever-increasing amount of information available to users via client-server networks.

It is often desirable to communicate information to a plurality of different recipients. More particularly, it is often desirable to replicate a large file among a number of distributed computers. For instance, in some situations it is desirable for a plurality of distributed clients to receive a replicated file. For example, suppose a number of client computers comprise a software application program, and the application program's provider makes a modification or update to the program. The application provider may desire to distribute the software update to each of the client computers. As another example, a company may receive a new software program and desire to distribute the software program to all of its computers that are communicatively coupled to the company's Local Area Network (LAN) or Intranet.

As still another example, it may be desirable for a large file to be replicated among a plurality of distributed servers. For instance, as described further below, a plurality of distributed servers may be established for efficiently serving content to clients (e.g., each server may be responsible for a particular geographical region of clients), and it may be desirable to replicate a file from an originating server to the other distributed servers such that all of the servers provide the same content to their respective clients. For example, Content Delivery Networks (CDNs) are based on a large-scale distributed network of servers located closer to the edges of the Internet for efficient delivery of digital content, including various forms of multimedia content. The main goal of the CDN's architecture is to minimize the network impact in the critical path of content delivery as well as to overcome a server overload problem, which is a serious threat for busy sites serving popular content. CDNs implementing distributed content servers are becoming increasingly popular on the Internet, and particularly within the World Wide Web (the "web") portion of the Internet, for example, for serving content (web documents) to clients. Many edge servers may be implemented within the Internet (e.g., hundreds, thousands, or even hundreds of thousands of edge servers may be implemented) that are each to serve the same, replicated content to their respective clients.

CDNs were developed to overcome performance problems, such as network congestion and server overload, that arise when many users access popular content. As mentioned above, CDNs improve end-user performance by storing popular content on edge servers located closer to users. This provides a number of advantages. First, it helps prevent server overload because the replicated content can be delivered to users from edge servers. Furthermore, because content is delivered from the closest edge server and not from the origin server, the content is sent over a shorter network path, thus reducing the request response time, the probability of packet loss, and the total network resource usage.

For many web documents (e.g., html pages and images having a relatively small file size) served via CDN, active replication of the original content at the edge servers may not be needed. The CDN's edge servers act as caching servers, and if the requested content is not yet in the cache at the time it is requested by a client, the content is retrieved from the original server using the so-called pull model. The performance penalty associated with the initial document retrieval from the original server to the edge server serving the requesting client, such as higher latency observed by the client and the additional load experienced by the original server, is generally not significant for small to medium size web documents.

For large files (e.g., large documents, software download packages, and media files), a different operational mode is typically preferred. In this case, it is typically desirable to replicate these files at edge servers in advance of a client requesting them, using the so-called push model. For large files, actively replicating the files to a plurality of distributed edge servers is a challenging, resource-intensive problem, e.g., media files can require significant bandwidth and download time due to their large sizes: a 20 minute media file encoded at 1 Mbit/s results in a file of 150 Mbytes. Thus, if such a large file was not actively replicated to the edge servers in advance of a client requesting the file, a significant performance penalty may be incurred for retrieving the file from the original server, such as higher latency observed by the client and the additional load experienced by the original server in providing the large file to the edge server serving the requesting client. Sites supported for efficiency reasons by multiple mirror servers face a similar problem: the original content needs to be replicated across the multiple, geographically distributed, mirror servers.

While CDNs were originally intended for static web content, recently, they have been applied to the delivery of streaming media as well. Streaming media is generally characterized by data that has a strict delay constraint. This delay constraint makes streaming media very sensitive to packet loss and network outages. For example, when receiving a streaming media session, data that arrives late is useless. Not only does streaming media suffer from the same problems associated with static content delivery, it also presents additional challenges due to the real-time nature of the content. Conventional approaches for dealing with packet loss for static data, such as retransmissions, may not be possible in a streaming context. Thus, additional mechanisms have been developed to provide streaming media delivery over packet networks.

Of the various techniques to improve streaming media quality, a method of multiple description coding (MDC) has been proposed. MDC is well-known in the art and is becoming increasingly popular for use with delivery of streaming media. See e.g., S. Wenger, "Video Redundancy Coding in H.263+", *Workshop on Audio-Visual Services for Packet Networks*, 1997; V. Goyal and J. Kovacevic, "Multiple description transform coding of images", Bell Labs, 1998; Justin Ridge, Fred W. Ware, and Jerry D. Gibson, "Multiple Descriptions, Error Concealment, and Refined Descriptions for Image Coding", *Proc. Second Annual UCSD Conference on Wireless Communications*, 1999; John G. Apostolopoulos and Susie J. Wee, "Unbalanced Multiple Description Video Communication Using Path Diversity", *IEEE International Conference on Image Processing (ICIP)*, Thessaloniki, Greece, October 2001; and John Apostolopoulos, Tina Wong, Wai-tian Tan, and Susie Wee, "On Multiple Description Streaming with Content Delivery Networks", *IEEE INFOCOM*, June 2002.

In general, MDC codes a media stream into two (or more) complementary descriptions (or "descriptors"). These descriptions have the property that if either description is received it can be used to decode baseline quality of the media stream (e.g., video, audio, etc.), and both descriptions can be used to decode improved quality of the media stream. More particularly, MDC is source coding for multiple channels such that a decoder which receives an arbitrary subset of the channels may produce a useful reconstruction.

Thus, MDC codes a media file into a plurality of complementary descriptions. If any one of the descriptions are received a baseline quality of the media file can be decoded, and if additional ones of the descriptions are received, improved quality of the media file can be decoded. This is in contrast to conventional video coders (e.g., MPEG-1/2/4, H.261/3, Microsoft's and Real Network's proprietary coders), which produce a single stream that does not have these MD properties (and may be referred to herein as single description coding (SDC)).

BRIEF SUMMARY OF THE INVENTION

In certain embodiments of the present invention, a method is provided for distributing from a first node to a plurality of recipient nodes a file encoded with multiple description coding. The method comprises distributing a plurality of descriptors of a file encoded with multiple description coding (MDC) from a first node to a first group comprising a plurality of recipient nodes, wherein at least one descriptor is distributed from the first node to each recipient node of the first group but not all of the plurality of descriptors are distributed from the first node to any of the recipient nodes of the first group. The method further comprises the plurality of recipient nodes of the first group exchanging their respective descriptors such that each recipient node of the first group obtains all of the plurality of descriptors.

In certain embodiments, a method is provided for distributing from a first node to a plurality of recipient nodes a file encoded with multiple description coding. The method comprises distributing a plurality of descriptors of a file encoded with multiple description coding (MDC) from a first node to at least a portion of a first group comprising a plurality of recipient nodes, wherein at least one descriptor is distributed from the first node to each recipient node of the at least a portion of the first group. The method further comprises the at least a portion of the first group communicating their respective descriptors received from the first node to other nodes of the first group.

In certain embodiments, a system comprises an origin node comprising means for distributing all of a plurality of descriptors of a file encoded with multiple description coding (MDC) from the origin node to a first group comprising a plurality of recipient nodes, wherein at least one descriptor is distributed from the origin node to each recipient node of the first group but not all of the plurality of descriptors are distributed from the origin node to any of the recipient nodes of the first group. Further, the recipient nodes of the first group each comprise means for exchanging their respective descriptors received from the origin node such that each recipient node of the first group obtains all of the plurality of descriptors.

In certain embodiments, a system comprises an origin node operable to distribute all of a plurality of descriptors of a file encoded with multiple description coding (MDC) to a first group of recipient nodes, wherein the origin node does not attempt to communicate all of said plurality of descriptors to all of the recipient nodes of the first group. The recipient nodes of the first group are each operable to communicate a descriptor that it receives from the origin node to other nodes of the first group.

In certain embodiments, a system comprises an origin node comprising means for distributing all of a plurality of descriptors of a file encoded with multiple description coding (MDC) from the origin node to at least a sub-group of a first group of a plurality of recipient nodes, wherein at least one descriptor is distributed from the origin node to each recipient node of the sub-group. The recipient nodes of the sub-group each comprise means for communicating their respective descriptors received from the origin node to other nodes of the first group.

BRIEF DESCRIPTION OF THE DRAWINGS

FIG. 4C shows an example of a recipient node of a sub-group receiving MDC descriptors from the other recipient nodes of the sub-group in accordance with the file distribution technique of FIG. 4A;

FIG. 5 shows an example operational flow diagram for distributing an MDC file from an origin node to a plurality of recipient nodes in accordance with an embodiment of the present invention;

FIGS. 12A-12B show an example operational flow diagram for distributing an MDC file to a plurality of recipient nodes in a scalable fashion in accordance with an embodiment of the present invention is shown.

DETAILED DESCRIPTION

Figure 1:
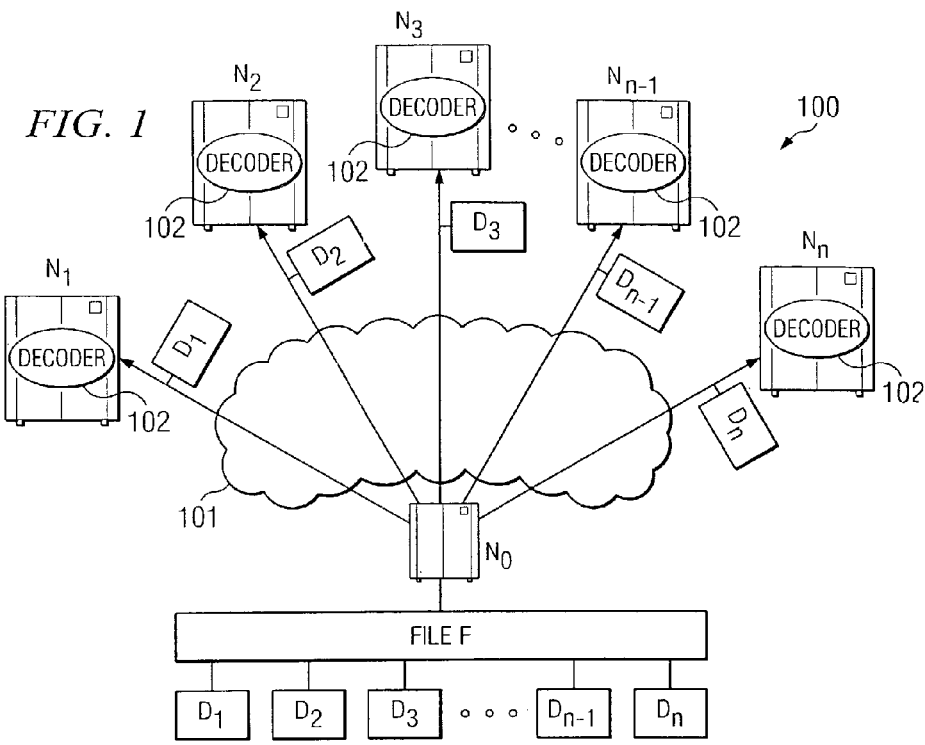
FIG. 1 shows an example environment in which embodiments of the present invention may be utilized and illustrates an example of distributing MDC descriptors from an origin node to a plurality of recipient nodes in accordance with a file distribution technique of an embodiment of the present invention.

Various embodiments of the present invention are now described with reference to the above figures, wherein like reference numerals represent like parts throughout the several views. As described further below, embodiments of the present invention provide a system and method for distributing a file from a first node (which may be referred to herein as the "origin" node) to a plurality of recipient nodes. More particularly, embodiments of the present invention provide a system and method for distributing an MDC file from a first node (or "origin" node) to a plurality of recipient nodes. In certain embodiments, the plurality of recipient nodes comprise servers, such as edge servers in a CDN or mirror servers as examples. Of course, embodiments of the present invention may also be utilized for distributing a file to client nodes.

According to an embodiment of the present invention, an MDC file to be distributed comprises a plurality of complementary descriptors, and the plurality of descriptors are distributed from the origin node to the recipient nodes. More particularly, all of the plurality of descriptors of the MDC file are desired to be communicated from an origin node to the recipient nodes, but the origin node does not send all of the descriptors to each recipient node. That is, the origin node sends only a portion of the descriptors to at least a portion of the recipient nodes. For instance, in one embodiment, each recipient node receives a different one of the descriptors of the MDC file to be distributed. Thereafter, the recipients exchange their respective descriptors with each other, thus resulting in each recipient obtaining all of the descriptors. Accordingly, the origin node is not required to communicate all of the descriptors to each recipient node, but rather may communicate only a portion thereof to each recipient node, and the recipient nodes then exchange their respective portions to result in each recipient node obtaining all descriptors of the MDC file.

In certain embodiments described below, the origin node may distribute descriptors to a sub-group of a group of recipient nodes, and the sub-group of nodes may then distribute the descriptors to the other nodes of the group. For instance, suppose an MDC file comprises m number of descriptors and is to be distributed to a group of n number of recipient nodes, wherein n>m. In certain embodiments, the origin node may establish concurrent connections with a sub-group of the n number of recipient nodes, wherein the sub-group comprises m number of recipient nodes. That is, nodes corresponding in number to the m number of descriptors of an MDC file to be distributed may be logically grouped into a sub-group. The origin node may transmit a different one of the m descriptors of the MDC file to each of the m nodes of the sub-group. Thereafter, each of the m nodes of the sub-group may establish concurrent communication connections with the remaining n−1 nodes of the group and distribute the descriptor that it received from the origin node to those remaining nodes. Accordingly, each of the n nodes of the group receives all of the descriptors of the MDC file, but the origin node is not required to communicate all of the descriptors to each recipient node.

Furthermore, the very nature of MDC encoding enhances the reliability of the distribution technique. For instance, if the communication of a descriptor from a first node to a second node is unsuccessful such that the second node fails to receive this descriptor, the second node may nevertheless receive a usable version of the MDC file (e.g., of lesser quality) if it receives at least one descriptor. Thus, while the distribution technique may attempt to distribute all of the descriptors of an MDC file to the recipient nodes (to provide the highest possible quality of the MDC file), if all of the descriptors are not received by particular ones of the recipient nodes, the distribution of the MDC file (having at least a baseline quality) to those particular recipient nodes may still be successful if at least one descriptor is received thereby.

According to an embodiment of the present invention, a file distribution technique is provided that is scalable for application in distributing an MDC file to a very large number of recipient nodes. For instance, embodiments of the present invention enable the recipient nodes to be logically organized into a plurality of different groups, with each group having a plurality of recipient nodes, and an MDC file is efficiently distributed to the plurality of groups of recipient nodes.

According to one embodiment, the MDC file to be distributed comprises a plurality of complementary descriptors as described above, and the plurality of descriptors are distributed from the origin node to a first group of recipient nodes. More particularly, all of the descriptors of the MDC file to be distributed are communicated from the origin node to at least a portion of the recipient nodes of the first group (e.g., at least to a sub-group thereof), but the origin node does not send all of the descriptors to each recipient node of the first group. That is, the origin node sends only a portion of its descriptors to at least a portion of the first group of recipient nodes. For instance, in one embodiment, each recipient node of a sub-group of the first group receives a different one of the descriptors of the MDC file. Thereafter, the recipient nodes of the sub-group each distribute their respective descriptors to the remaining recipient nodes of the first group, thus resulting in each recipient node of the first group obtaining all of the descriptors of the MDC file. Accordingly, the origin node is not required to communicate all of the descriptors to each recipient node of the first group, but rather may communicate only a portion thereof to a sub-group of the first group, and those recipient nodes of the sub-group then distribute their respective descriptors to the remaining nodes of the first group.

Various techniques may be implemented for distributing a file, such as an MDC file, from an origin node to a first group of recipient nodes in the manner described above. One embodiment of the present invention implements a technique referred to herein as the FastReplica distribution technique. With FastReplica, an MDC file F comprising m descriptors may be replicated among a group of n recipient nodes by transferring each descriptor from the origin node to a different node in the recipient group. That is, the MDC descriptors are communicated to recipient nodes from the origin node concurrently. Such transfer of the MDC descriptors from the origin node to the recipient nodes is referred to herein as a "distribution" step. Thereafter, each recipient node that received an MDC descriptor from the origin node propagates its respective MDC descriptor (i.e., the descriptor that it received from the origin node) to the remaining recipient nodes in the group. That is, each recipient node that received a descriptor concurrently communicates its descriptor to the other nodes of the group. This exchange of descriptors by recipient nodes is referred to herein as a "collection" step, as the recipient nodes each collect the descriptors of MDC file F from the other recipient nodes. Thus, instead of typical replication of all of the m descriptors to n nodes by using n communication paths (e.g., Internet paths) connecting the origin node to the replication group, this FastReplica technique exploits m×n communication paths within the replication group where each path is used for transferring one of the m MDC descriptors. Co-pending and commonly assigned U.S. patent application Ser. No. 10/345,716, titled "SYSTEM AND METHOD FOR EFFICIENTLY REPLICATING A FILE AMONG A PLURALITY OF RECIPIENTS", the disclosure of which has been incorporated herein by reference, further describes an example file distribution technique that may be used for distribution of MDC descriptors in embodiments of the present invention.

As mentioned above, embodiments of the present invention are scalable and enable distribution of an MDC file to a plurality of groups of recipient nodes. Various distribution techniques may be utilized to enable the distribution of an MDC file to a plurality of different groups of recipient nodes. In one implementation, an origin node distributes the descriptors of MDC file F to a first group of recipient nodes, such as in the above-described distribution step of the FastReplica distribution technique. Thereafter, the recipient nodes of the first group exchange their respective descriptors of MDC file F, such as in the above-described collection step of the FastReplica distribution technique. While the first group performs this collection step, the origin node may perform a distribution of the descriptors of MDC file F to a second group of recipient nodes. Thereafter, the recipient nodes of the second group exchange their respective descriptors of MDC file F, such as in the above-described collection step of the FastReplica distribution technique. While the second group performs this collection step, the origin node may perform a further distribution of the descriptors of MDC file F to a third group of recipient nodes. Further, once the first group has performed the collection step, each of those nodes may establish a communication connection to each of the nodes of a fourth group of recipient nodes, and each node of the first group may communicate the descriptor that it received from the origin node to each node of the fourth group. Thus, at the end of this distribution from the first group to the fourth group, each node of the fourth group has all of the descriptors of MDC file F, and therefore do not need to perform a collection step within such fourth group. Such a distribution from the first group to the fourth group is referred to herein as a "group-to-group" distribution.

In another scaled distribution implementation, an origin node distributes the descriptors of MDC file F to a first group of recipient nodes, such as in the above-described distribution step of the FastReplica distribution technique. Thereafter, the recipient nodes of the first group exchange their respective descriptors of MDC file F, such as in the above-described collection step of the FastReplica distribution technique. Thereafter, the recipient nodes of the first group may each act as an origin node to distribute MDC file F to further groups of recipient nodes in a manner such as that used to distribute the MDC file F to this first group, e.g., each node of the first group may use the FastReplica distribution technique to distribute MDC file F to further groups of recipient nodes. In this manner, the FastReplica distribution technique may be performed iteratively wherein after a group of nodes receives MDC file F through the FastReplica distribution technique, each of such nodes may act as an origin node to distribute file F to further groups of nodes using the FastReplica distribution technique. Thus, in this example implementation, each node that is used for distribution of MDC file F to further recipient nodes distributes the file F to a plurality of recipient nodes (e.g., to another group having a plurality of recipient nodes), and therefore such distribution technique may be referred to herein as a "one-to-many" distribution.

As described further below, in certain distribution environments the second scaled distribution technique identified above results in a wider, shorter distribution tree than the first scaled distribution technique identified above. Accordingly, in those environments, the second scaled distribution technique provides improved efficiency in distributing MDC file F. In certain implementations described herein, a hybrid of the above-identified scaled distribution techniques may be used. For instance, "one-to-many" distributions may be performed for certain group(s) of recipient nodes, and "group-to-group" distribution may be performed for other group(s) of recipient nodes. Co-pending and commonly assigned U.S. patent application Ser. No. 10/345,718, titled "SYSTEM AND METHOD FOR EFFICIENTLY REPLICATING A FILE AMONG A PLURALITY OF RECIPIENTS HAVING IMPROVED SCALABILITY", the disclosure of which has been incorporated herein by reference, further describes scalable file distribution techniques that may be used for distribution of MDC descriptors in embodiments of the present invention.

To better appreciate aspects of embodiments of the present invention, it is appropriate to briefly review the existing techniques in the art for file distribution. Currently, the three most popular methods used for content distribution (or file "replication") in the Internet environment are: (1) satellite distribution, (2) multicast distribution, and (3) application-level multicast distribution.

With satellite distribution, the content distribution server (or the "origin node") has a transmitting antenna. The servers (or "recipient nodes") to which the content should be replicated (or the corresponding Internet Data centers, where the servers are located) have a satellite receiving dish. The original content distribution server broadcasts a file via a satellite channel. Among the shortcomings of the satellite distribution method are that it requires special hardware deployment and the supporting infrastructure (or service) is quite expensive.

With multicast distribution, an application can send one copy of each packet of a file and address it to the group of recipient nodes (IP addresses) that want to receive it. This technique reduces network traffic by simultaneously delivering a single stream of information to hundreds/thousands of interested recipients. Multicast can be implemented at both the data-link layer and the network layer. Applications that take advantage of multicast technologies include video conferencing, corporate communications, distance learning, and distribution of software, stock quotes, and news. Among the shortcomings of the multicast distribution method is that it requires a multicast support in routers, which still is not consistently available across the Internet infrastructure.

Since the native IP multicast has not received widespread deployment, many industrial and research efforts have shifted to investigating and deploying the application level multicast, where nodes across the Internet act as intermediate routers to efficiently distribute content along a predefined mesh or tree. A growing number of researchers have advocated this alternative approach, where all multicast related functionality, including group management and packet replication, is implemented at end systems. In this architecture, nodes participating in the multicast group self-organize themselves into a scalable overlay structure using a distributed protocol. Further, the nodes attempt to optimize the efficiency of the overlay by adapting to changing network conditions and considering the application-level requirements.

An extension for the end-system multicast is introduced by J. Byers, J. Considine, and M. Mitzenmacher in "Informed Content Delivery Across Adaptive Overlay Networks", *Proc. Of ACM SIGCOMM*, 2002, in which instead of using the end systems as routers forwarding the packets, the authors propose that the end-systems actively collaborate in an informed manner to improve the performance of large file distribution. The main idea is to overcome the limitation of the traditional service models based on tree topologies where the transfer rate to the client is defined by the bandwidth of the bottleneck link of the communication path from the origin server. The authors propose to use additional cross-connections between the end-systems to exchange the complementary content these nodes have already received. Assuming that any given pair of end-systems has not received exactly the same content, these cross-connections between the end-systems can be used to "reconcile" the differences in received content in order to reduce the total transfer time.

As mentioned above, embodiments of the present invention may implement a distribution technique referred to herein as the FastReplica distribution technique. Example embodiments implementing such FastReplica technique are described further below. Consider the following notations:
(a) Let $N_0$ be a node (which may be referred to as an "origin node" or "origin server") which has an MDC file F that comprises m descriptors; and
(b) Let $R=\{N_1, \ldots, N_n\}$ be a replication set of nodes (i.e., a set of recipient nodes to which the descriptors of file F are to be distributed).

The problem becomes replicating file F across nodes $N_1, \ldots, N_n$, while minimizing the overall replication time. In one embodiment, the group of recipient nodes $N_1, \ldots, N_n$ is equal to the number m of descriptors of MDC file F (i.e., n=m), and n is a sufficiently small number of recipient nodes such that each node $N_0, \ldots, N_n$ can support concurrent communication connections to all of the other n−1 nodes, which is typically 30 or less recipient nodes. The FastReplica technique may be implemented for application to such a relatively small group of recipient nodes, wherein such an implementation may be referred to herein as "FastReplica in the Small."

In this first example application of the FastReplica in the Small technique, MDC file F comprises m descriptors: $D_1, \ldots, D_m$, where m=n. The FastReplica in the Small algorithm then performs a distribution step in which origin node $N_0$ opens n concurrent network connections to nodes $N_1, \ldots, N_n$, and sends to each recipient node $N_i$ (1≤i≤n) the following items:
(a) a distribution list of nodes $R=\{N_1, \ldots, N_n\}$ to which descriptor $D_i$ is to be sent in the next step (each node $N_i$ is itself excluded from its distribution list); and
(b) descriptor $D_i$.

Thereafter, a collection step may be performed in which the recipient nodes $N_1, \ldots, N_n$ exchange their respective descriptors received from the origin node $N_0$. For example, each of the recipient nodes $N_1, \ldots, N_n$ may establish concurrent communication connections with the other ones of recipient nodes $N_1, \ldots, N_n$ and communicate the descriptor it received from origin node $N_0$ to those recipient nodes via the concurrent communication connections.

In another embodiment, a relatively small group of recipient nodes $N_1, \ldots, N_n$ exist (e.g., a sufficiently small number of recipient nodes such that each node $N_0, \ldots, N_n$ can support concurrent communication connections to all of the other n−1 nodes, which is typically 30 or less recipient nodes), but the number of recipient nodes is greater than the number of descriptors of MDC file F (i.e., n>m). In this embodiment, FastReplica in the Small may be implemented to perform a distribution step in which origin node $N_0$ opens m concurrent network connections to nodes $N_1, \ldots, N_m$ (i.e., a "sub-group" of the group of n recipient nodes), and sends to each recipient node $N_i$(1≤i≤m) the following items:
(a) a distribution list of nodes $R=\{N_1, \ldots, N_n\}$ to which descriptor $D_i$ is to be sent in the next step (each node $N_i$ is itself excluded from its distribution list); and
(b) descriptor $D_i$.

For example, suppose 20 recipient nodes exist (i.e., n=20) to which an MDC file having 4 descriptors (i.e., m=4) is to be distributed from origin node No. The m recipient nodes with which origin node No directly communicates may be referred to herein as a "sub-group" of the group of recipient nodes (i.e., a "sub-group" of the group of 20 recipient nodes in this example). Further, each of the recipient nodes may be capable of establishing at least n−1 (i.e., 19 in this example) concurrent communication connections. In one embodiment of the present invention, origin node $N_0$ opens 4 concurrent network connections, one connection to each of nodes $N_1, \ldots, N_4$, and sends to each recipient node $N_i$ (1≤i≤4) the following items:
(a) a distribution list of nodes $R=\{N_1, \ldots, N_{20}\}$ to which descriptor $D_i$ is to be sent in the next step (each node $N_i$ is itself excluded from its distribution list); and
(b) descriptor $D_i$.

Thereafter, a collection step may be performed in which the recipient nodes $N_1, \ldots, N_m$ each distribute their respective descriptors received from the origin node $N_0$ to the others of recipient nodes $N_1, \ldots, N_n$. For instance, the recipient nodes $N_1, \ldots, N_m$ may exchange their respective descriptors received from the origin node $N_0$ with one another, as well as distribute their respective descriptors to the others of recipient nodes $N_1, \ldots, N_n$. In certain embodiments, each of the recipient nodes $N_1, \ldots, N_m$ may establish concurrent communication connections with the other ones of recipient nodes $N_1, \ldots, N_n$ and communicate the descriptor it received from origin node $N_0$ to those recipient nodes via the concurrent communication connections.

An example of one application of the distribution step of the FastReplica algorithm is shown in FIG. 1. For instance, FIG. 1 shows an example environment 100 in which embodiments of the present invention may be utilized. Environment 100 comprises origin node $N_0$ and recipient nodes $N_1$, $N_2$, $N_3$, ..., $N_{n-1}$, $N_n$ that are communicatively coupled via communication network 101. Communication network 101 is preferably a packet-switched network, and in various implementations may comprise, as examples, the Internet or other Wide Area Network (WAN), an Intranet, Local Area Network (LAN), wireless network, Public (or private) Switched Telephony Network (PSTN), a combination of the above, or any other communications network now known or later developed within the networking arts that permits two or more computing devices to communicate with each other. In certain embodiments, nodes $N_0$-$N_n$ comprise server computers. For instance, nodes $N_1$, ..., $N_n$ may comprise edge servers in a CDN or mirror servers within a mirrored network. In other embodiments, nodes $N_0$-$N_n$ may comprise server and/or client computers. For example, node $N_0$ may comprise a server computer, and nodes $N_1$, ..., $N_n$ may comprise client computers to receive an MDC file from node $N_0$.

Origin node $N_0$ comprises MDC file F stored thereto, and such MDC file F is coded to comprise n complementary descriptors $D_1$, $D_2$, $D_3$, ..., $D_{n-1}$, $D_n$ in this example. Thus, in this example, the number of descriptors of MDC file F is equal to the number of recipient nodes to which file F is to be distributed. As shown, the plurality of descriptors of MDC file F are distributed from origin node $N_0$ to the recipient nodes $N_1$, ..., $N_n$. More particularly, all of the n descriptors are communicated from origin node $N_0$ to the recipient nodes $N_1$, ..., $N_n$, but origin node $N_0$ does not send all of the n descriptors to each recipient node. That is, origin node $N_0$ sends only a portion of the n descriptors to each recipient node. For instance, in this example, each recipient node receives a different one of the n descriptors from origin node $N_0$. More particularly, origin node $N_0$ communicates descriptor $D_1$ to node $N_1$, descriptor $D_2$ to node $N_2$, descriptor $D_3$ to node $N_3$, ..., descriptor $D_{n-1}$ to node $N_{n-1}$, and descriptor $D_n$ to node $N_n$ via communication network 101.

Each of recipient nodes $N_1$, ..., $N_n$ may comprise a decoder 102 that is operable to decode the received descriptor(s) of MDC file F. MDC encoding techniques are well-known in the art, and MDC decoders are well-known. If any one of the descriptors of file F are received by a recipient node, baseline quality of file F can be decoded by the node's decoder 102, and if additional ones of the descriptors are received, improved quality of file F can be decoded by the node's decoder 102. MDC is a popular encoding technique for encoding images and streaming media, as examples, and thus in certain applications file F may comprise an image file or a streaming media file. Of course, in other applications file F may comprise any type of file that is encoded with MDC.

Figure 2:
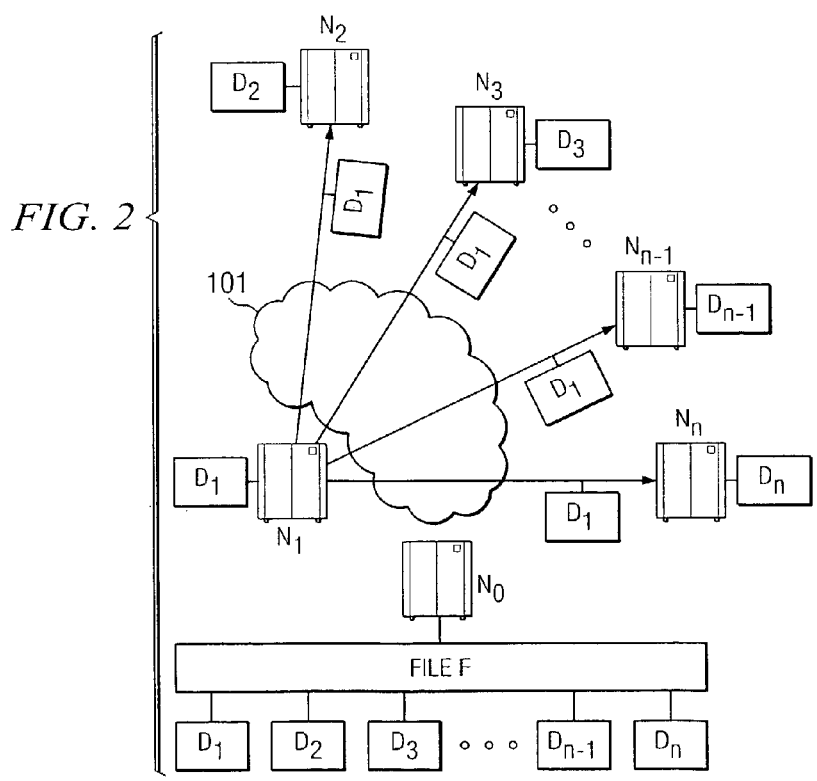
FIG. 2 shows an example of a recipient node communicating the MDC descriptor that it received from an origin node to other recipient nodes in accordance with the file distribution technique of FIG. 1.

The next step of the FastReplica algorithm is referred to herein as the "collection" step. An example of one implementation of the collection step is described herein in conjunction with FIGS. 2 and 3. After receiving descriptor $D_i$ of MDC file F, node $N_i$ opens (n−1) concurrent network connections to remaining nodes in the recipient group and sends descriptor $D_i$ to them, as shown in FIG. 2 for node $N_1$. More particularly, FIG. 2 shows that node $N_1$ opens n−1 concurrent network connections, i.e., one network connection with each of recipient nodes $N_2$, ..., $N_n$. Node $N_1$ communicates descriptor $D_1$, which it received from origin node $N_0$ in the above-described distribution step, to each of the recipient nodes $N_2$, ..., $N_n$.

Figure 3:
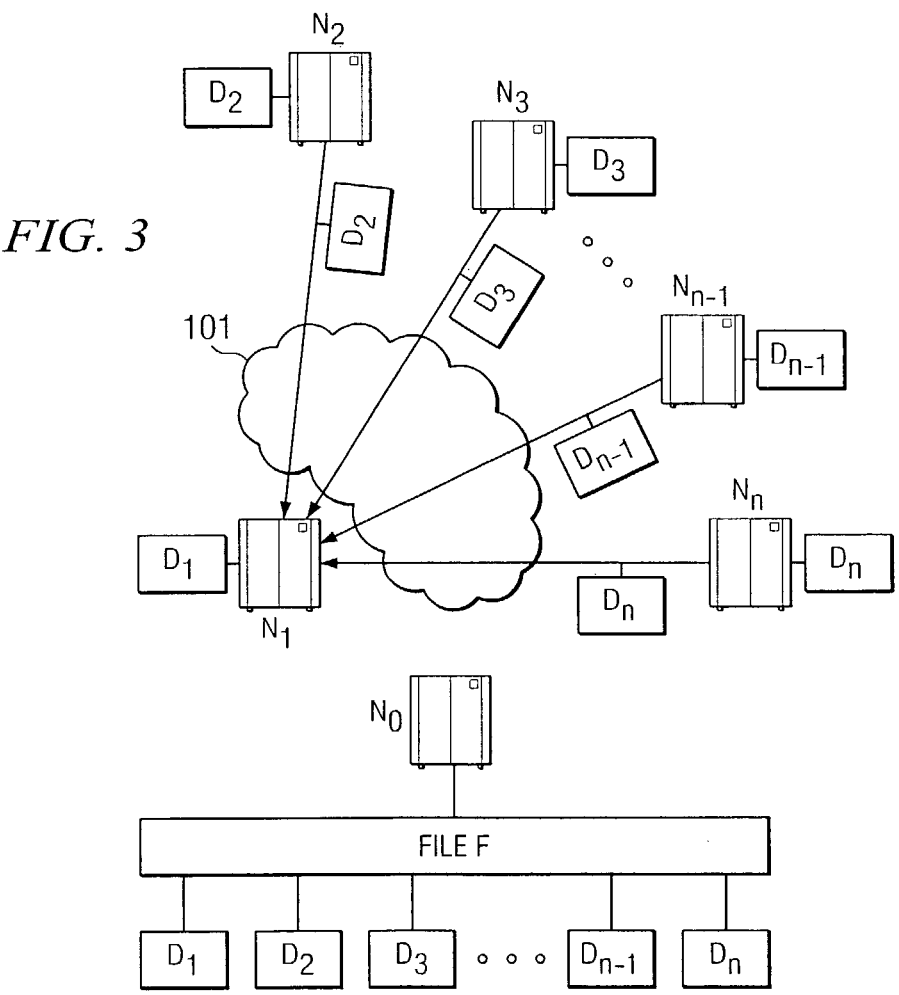
FIG. 3 shows an example of a recipient node receiving MDC descriptors from each of the other recipient nodes in accordance with the file distribution technique of FIG. 1.

Similarly, FIG. 3 shows the set of incoming, concurrent connections to node $N_1$ from the remaining recipient nodes $N_2$, ..., $N_n$, transferring the complementary descriptors $D_2$, ..., $D_n$ of MDC file F to node $N_1$ during the collection step of the FastReplica algorithm. More particularly, FIG. 3 shows that node $N_1$ has n−1 concurrent network connections, i.e., one network connection with each of recipient nodes $N_2$, ..., $N_n$ through which node $N_1$ receives the other descriptors of MDC file F from the recipient nodes $N_2$, ..., $N_n$. That is, each of recipient nodes $N_2$, ..., $N_n$ communicates to node $N_1$ its respective descriptor of MDC file F that it received from origin node $N_0$ in the above-described distribution step (of FIG. 1).

Thus at the end of this collection step, each node $N_i$ has the following set of network connections:
(a) there are n−1 outgoing connections from node $N_i$: one connection to each node $N_k$ ($k \neq i$) for sending the corresponding descriptor $D_i$ to node $N_k$; and
(b) there are n−1 incoming connections to node $N_i$: one connection from each node $N_k$ ($k \neq i$) for sending the corresponding descriptor $D_k$ to node $N_i$.

Thus, at the end of this collection step, each recipient node receives all descriptors $D_1$, ..., $D_n$ of the MDC file F. Accordingly, each of the nodes in the replication set R obtain the full set of descriptors of MDC file F.

In view of the above, it should be recognized that instead of the typical replication of an entire file to n nodes by using n communication paths connecting the origin node $N_0$ to the replication group, the example FastReplica algorithm described above exploits n×n different communication paths within the replication group wherein each path is used for transferring one of the n descriptors of MDC file F. Thus, the impact of congestion on any particular communication path participating in the schema is limited for a transfer of one of the n descriptors of MDC file F. Additionally, the example FastReplica algorithm described above takes advantage of both the upload and download bandwidth of the recipient nodes. Typical servers in CDN environments have symmetrical upload and download bandwidth to be able to utilize this feature. Such FastReplica algorithm and its efficiency for various types of bandwidths that may be available between the nodes is discussed further in co-pending and commonly assigned U.S. patent application Ser. No. 10/345,716, titled "SYSTEM AND METHOD FOR EFFICIENTLY REPLICATING A FILE AMONG A PLURALITY OF RECIPIENTS", the disclosure of which is hereby incorporated herein by reference.

Figure 4A:
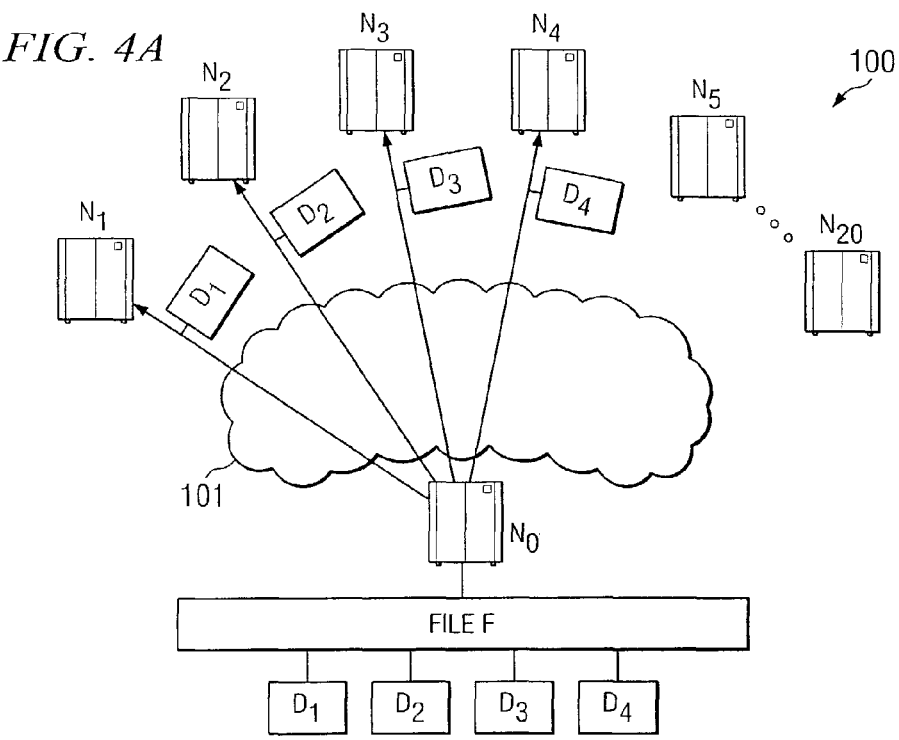
FIG. 4A shows an example environment in which embodiments of the present invention may be utilized and illustrates an example technique of distributing MDC descriptors from an origin node to a sub-group of recipient nodes in accordance with a file distribution technique of an embodiment of the present invention.
Figure 4B:
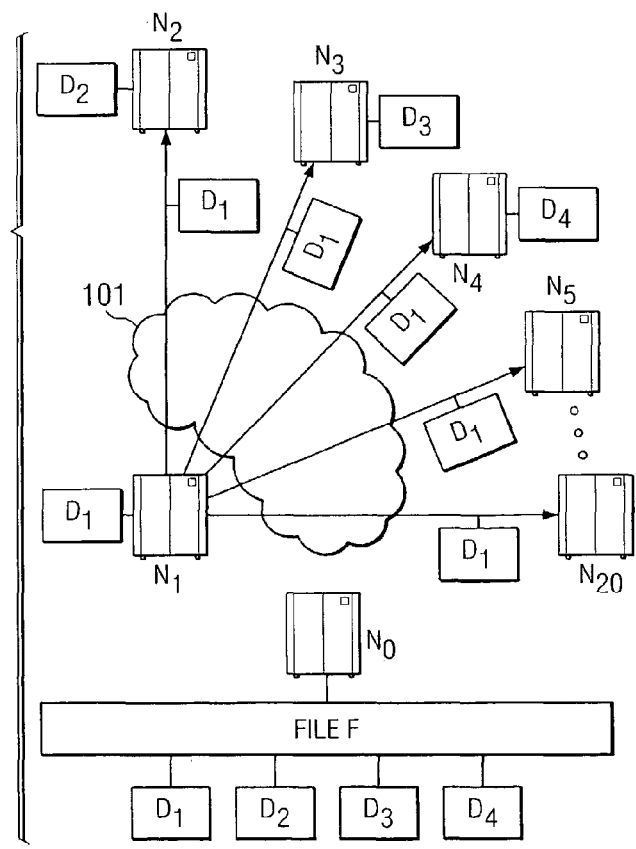
FIG. 4B shows an example of a recipient node of a sub-group communicating the MDC descriptor that it received from an origin node to other recipient nodes in accordance with the file distribution technique of FIG. 4A.

Another example application of the FastReplica algorithm is shown in FIGS. 4A-4C. For instance, FIG. 4A again shows an example environment 100 in which embodiments of the present invention may be utilized. In this example, environment 100 comprises origin node $N_0$ and 20 recipient nodes $N_1$, $N_2$, $N_3$, $N_4$, $N_5$, ..., $N_{20}$ that are communicatively coupled via communication network 101. As with FIG. 1, nodes $N_0$-$N_{20}$ may comprise server computers, such as edge servers in a CDN or mirror servers within a mirrored network, and/or some or all of the nodes may comprise client computers. Further, although not specifically shown in FIGS. 4A-4C, each of recipient nodes $N_1$, $N_2$, $N_3$, $N_4$, $N_5$, ..., $N_{20}$ may comprise MDC decoders, such as decoder 102 of FIG. 1 above.

Origin node No comprises MDC file F stored thereto, and such MDC file F of the illustrated embodiment is coded to comprise 4 complementary descriptors $D_1$, $D_2$, $D_3$, $D_4$ in this example. Thus, in this example, the number of descriptors of MDC file F is less than the number of recipient nodes to which file F is to be distributed. While 20 recipient nodes are shown in this example and 4 descriptors, the distribution technique described below for FIGS. 4A-4C may be utilized with other implementations that comprise any number n of recipient nodes and any number m of descriptors of MDC file F in which n is greater than m. As shown in FIG. 4A, the plurality of descriptors of MDC file F are distributed from origin node $N_0$ to a sub-group of the recipient nodes $N_1, \ldots, N_n$, wherein such sub-group comprises nodes $N_1$, $N_2$, $N_3$, $N_4$. In this example, each recipient node of the sub-group receives a different one of the 4 descriptors from origin node $N_0$. More particularly, origin node $N_0$ communicates descriptor $D_1$ to node $N_1$, descriptor $D_2$ to node $N_2$, descriptor $D_3$ to node $N_3$, and descriptor $D_4$ to node $N_4$ via communication network 101.

The collection step of the FastReplica algorithm may then be performed in the manner described in conjunction with FIGS. 4B and 4C. In this example, k number of concurrent communication connections can be supported by each of the recipient nodes, wherein n<k (i.e., the total number of recipient nodes, 20 in this example, is less than the number k of concurrent communication connections that can be supported by each of the recipient nodes). After receiving descriptor $D_i$ of MDC file F, node $N_i$ of the sub-group of recipient nodes opens n−1 concurrent network connections (i.e., wherein n=20 in this example) to remaining nodes in the recipient group and sends descriptor $D_i$ to them, as shown in FIG. 4B for node $N_1$. More particularly, FIG. 4B shows that node $N_1$ opens n−1 concurrent network connections (or 19 concurrent network connections in this example), i.e., one network connection with each of recipient nodes $N_2, \ldots, N_n$ (where n=20 in this example). Node $N_1$ communicates descriptor $D_1$, which it received from origin node $N_0$ in the above-described distribution step, to each of the recipient nodes $N_2, \ldots, N_n$. Each of nodes $N_2$, $N_3$, and $N_4$ of the sub-group of recipient nodes distributes their respective descriptors received from origin node $N_0$ to the others of recipient nodes $N_1$-$N_{20}$ in a manner as described for the distribution of descriptor $D_1$ from node $N_1$.

Similarly, FIG. 4C shows the set of incoming, concurrent connections to node $N_1$ from the remaining recipient nodes $N_2, N_3, N_4$ of the sub-group of recipient nodes via which those nodes transfer their respective complementary descriptors $D_2, D_3, D_4$ of MDC file F to node $N_1$ during the collection step of the FastReplica algorithm. More particularly, FIG. 4C shows that node $N_1$ has m−1 concurrent network connections (wherein m is the number of descriptors of MDC file F, which is 4 in this example), i.e., one network connection with each of recipient nodes $N_2, N_3, N_4$ of the sub-group through which node $N_1$ receives the other descriptors of MDC file F from those recipient nodes of the sub-group. That is, each of recipient nodes $N_2, N_3, N_4$ of the sub-group communicates to node $N_1$ its respective descriptor of MDC file F that it received from origin node No in the above-described distribution step (of FIG. 4A).

Each of the nodes $N_2$, $N_3$, $N_4$ of the sub-group have communication connections with the other nodes of the sub-group for receiving the descriptors from those other nodes in a manner similar to that shown in FIG. 4C for node $N_1$. Thus, each node of the sub-group has m−1 incoming concurrent connections for receiving the remaining m−1 descriptors of MDC file F that it did not receive directly from origin node $N_0$. In this manner, the nodes of the sub-group exchange their respective descriptors that they each received from origin node $N_0$ with one another.

Also, as shown in FIG. 4B for node $N_1$, each of the sub-group of recipient nodes that received a descriptor from origin node $N_0$ also communicates its respective descriptor to the recipient nodes that are not members of the sub-group (i.e., nodes $N_5$-$N_{20}$ in this example). Accordingly, each of the nodes that are not members of the sub-group has m incoming concurrent connections for receiving the m descriptors of MDC file F (e.g., one incoming connection with each node of the sub-group).

Thus, at the end of the above collection step, each recipient node $N_1$-$N_{20}$ receives all descriptors $D_1$-$D_4$ of the MDC file F. Accordingly, each of the nodes in the replication set R obtain the full set of descriptors of MDC file F.

FIG. 5 shows an example operational flow diagram for distributing an MDC file from an origin node to a plurality of recipient nodes in accordance with an embodiment of the present invention. In operational block 501, a number m of descriptors of an MDC file F to be distributed is determined. More specifically, an origin node may determine the number m of descriptors of MDC file F that it is to distribute to recipient nodes. Typically, an MDC file comprises 10 or less descriptors, but any number m descriptors may be implemented for an MDC file within the scope of embodiments of the present invention.

In operational block 502, the distribution step of the FastReplica technique is performed. More particularly, the descriptors of MDC file F are distributed from the origin node to at least a portion of the recipient nodes, wherein the origin node does not attempt to communicate all descriptors of the MDC file F to all of the recipient nodes. As shown, in certain embodiments block 502 may comprise operational block 502A, wherein a different descriptor is distributed from the origin node to each recipient node. Of course, in certain embodiments, as described with FIG. 4A above, the origin node may distribute the descriptors to a portion (e.g., sub-group) of the recipient nodes. For instance, if the total number n of recipient nodes is greater than the number m of descriptors, the origin node may determine a sub-group of the recipient nodes comprising m members to which the origin node distributes the descriptors of file F.

In operational block 503, the collection step of FastReplica is performed. More particularly, each recipient node that received a descriptor from the origin node communicates its descriptor to all other recipient nodes. Thus, as a result of such collection step, each recipient node obtains all of the determined number of descriptors of the MDC file F. In operational block 504, scaling operations may be performed, if needed. That is, if the number of recipient nodes is sufficiently large, the distribution process may be scaled to enable distribution to such a large number of recipient nodes. For instance, the distribution technique may be scaled to allow for a file distribution to hundreds, thousands, or tens of thousands, of recipient nodes, for example. More particularly, if it is determined that the number k of concurrent communication connections that can be supported by each of the nodes $N_0, \ldots, N_n$ is less than the total number of recipient nodes n, then the distribution technique may be scaled for distribution to a plurality of groups of recipient nodes as described further below. Various suitable scaling techniques may be utilized.

One scaling technique that may be implemented is described in co-pending and commonly assigned U.S. patent application Ser. No. 10/345,716, titled "SYSTEM AND METHOD FOR EFFICIENTLY REPLICATING A FILE AMONG A PLURALITY OF RECIPIENTS", the disclosure of which has been incorporated herein by reference. This first scaling technique that may be implemented is described herein below in conjunction with FIGS. 6-9. According to this first scaling technique, the above-described FastReplica in the Small distribution strategy is generalized to a case in which a set of nodes to which MDC file F is to be distributed is very large (e.g., hundreds, thousands, tens of thousands, or more of such recipient nodes). According to one example implementation of this scaling technique, let k be a number of network connections chosen for concurrent transfers between a single node and multiple recipient nodes (k limits the number of nodes in each distribution group for the above-described FastReplica strategy). An appropriate value of k can be experimentally determined for a given environment via probing, for example. Heterogeneous nodes might be capable of supporting a different number of connections, in which case the value of k may be a number of connections suitable for most of the nodes in the overall replication set.

Figure 6:
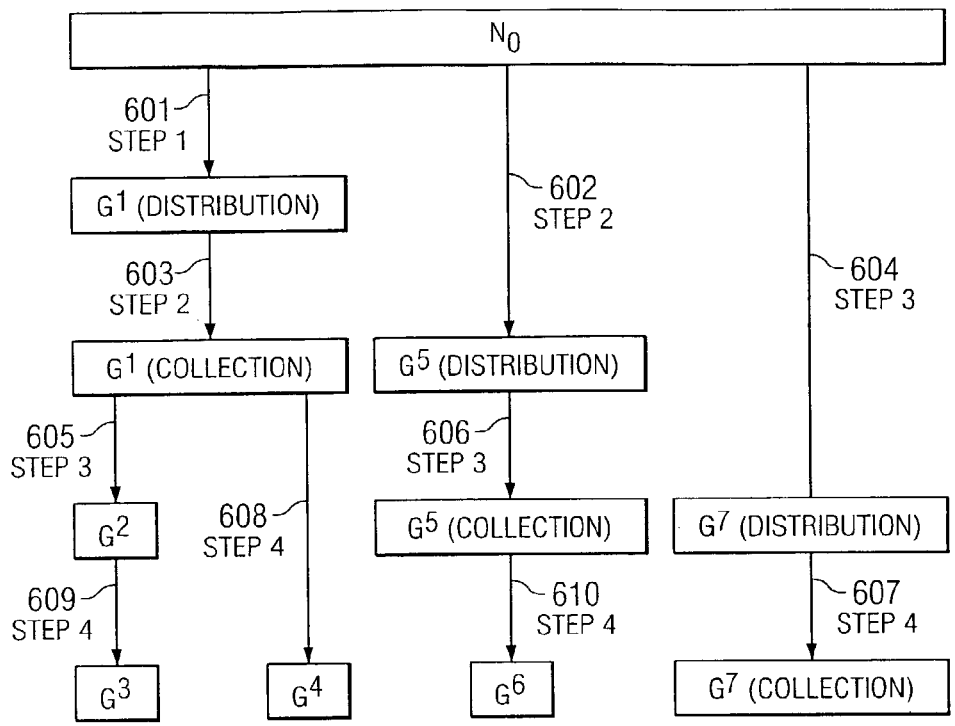
FIG. 6 shows a first example scaling technique for a file distribution process of an embodiment of the present invention.

This first example scaling technique is described in conjunction with FIG. 6 in which $G^1, G^2, \ldots, G^7$ are used to denote the replication groups of nodes, each group having k nodes. The boxes in the example of FIG. 6 reflect the node or group of nodes involved in the communications on a particular logical step of the algorithm. FIG. 6 provides an example in which 4 logical steps are performed in the scaled distribution process, but as will be recognized from the description of such scaled distribution process any other number of logical steps may be appropriate in other implementations (depending on the number of nodes to which the MDC file F is being distributed).

First, in the example of FIG. 6, origin node $N_0$ opens m concurrent network connections to nodes $N_1^1, \ldots, N_m^1$ of group $G^1$, wherein m corresponds to the number of descriptors of MDC file F and wherein m is less than or equal to k. Generally, m is less than k because MDC files are typically encoded with no more than 10 descriptors and each node of a network (e.g., CDN) is often capable of supporting more than 10 concurrent connections. As with the example of FIG. 4A above, the origin node communicates descriptor $D_i$ to the corresponding recipient node $N_i^1 (1 \le i \le m)$, such that the origin node distributes descriptors to a sub-group of m recipient nodes. This first step is represented by communication path(s) 601 to box $G^1$ (distribution) in FIG. 6 and is similar to the distribution step of FastReplica in the Small described above in conjunction with FIGS. 1 and 4A.

In the second step of this example scaled distribution algorithm:

(a) In group $G^1$, each node $N_i^1$ to which the origin node $N_0$ sent a descriptor communicates its descriptor $D_i$ to the rest of the nodes in group $G^1$. In this way, at the end of this step, each node in group $G^1$ has all descriptors $D_1, \ldots, D_m$ of MDC file F. This step is represented by communication path(s) 603 to box $G^1$ (collection) in FIG. 6 and is similar to the collection step of FastReplica in the Small described above in FIGS. 2, 3, 4B, and 4C. It should be noted that the activities performed in this second step are not synchronized between the different nodes of group $G^1$. Rather, node $N_i^1$ starts transferring its descriptor $D_i$ to the remaining nodes of group $G^1$ independently of the similar step performed by the other nodes that received a descriptor from origin node $N_0$. This distributed nature of the FastReplica algorithm makes it more efficient. Thus, during the same physical time, the nodes in the group can perform different logical steps of the algorithm. For example, while some of the nodes of $G^1$ might be, still finishing step 2 of the algorithm, some of the "faster" nodes of $G^1$ might start transfers related to step 3 of the algorithm (described below).

(b) In the same logical step (step 2), originator node $N_0$ opens m concurrent network connections to nodes $N_1^5, \ldots, N_m^5$ of group $G^5$, wherein m corresponds to the number of descriptors of MDC file F and wherein m is less than or equal to k. As with the example of FIG. 4A above, the origin node communicates descriptor $D_i$ to the corresponding recipient node $N_i^5 (1 \le i \le m)$, such that the origin node distributes descriptors to a sub-group of m recipient nodes. This step is represented by communication path(s) 602 to box $G^5$ (distribution) in FIG. 6.

Figure 7:
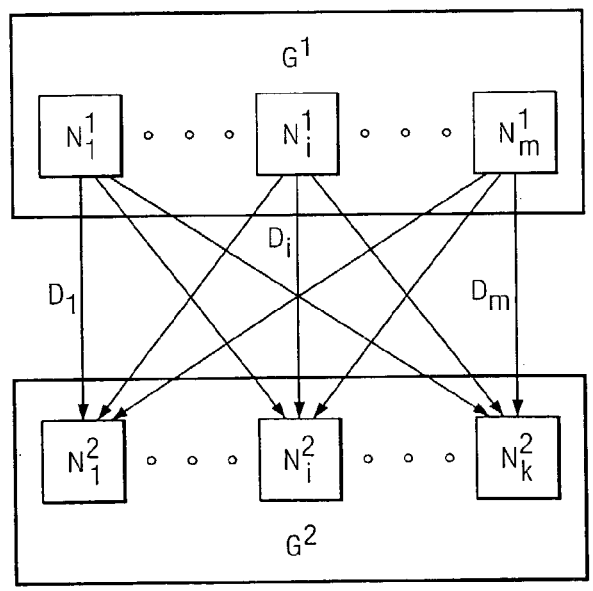
FIG. 7 shows communication paths between two groups of nodes in the first scaled distribution process of FIG. 6.
Figure 8:
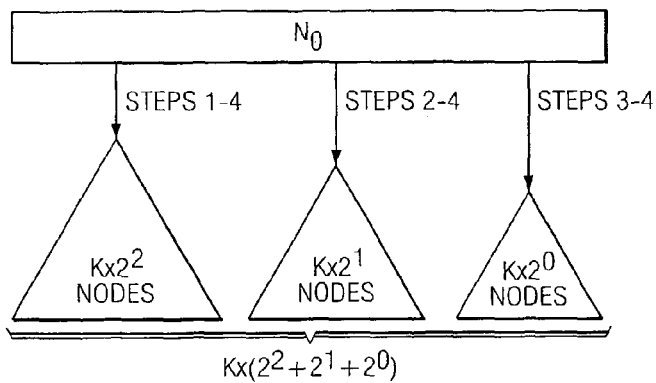
FIG. 8 shows a graphical representation of the number of recipient nodes to which an MDC file F can be replicated in 4 logical steps in accordance with the first scalable file distribution process of FIG. 6.

The above communications at steps 1 and 2 are similar to the communications defined in the example FastReplica in the Small algorithm described above in FIGS. 4A-4C. In step 3 of this example scaled distribution algorithm of FIG. 6, the communications between groups $G^1$ and $G^2$ follow a different file exchange protocol defining another typical communication pattern actively used in the general FastReplica algorithm. Of course, in other embodiments, any other suitable distribution technique may be used between groups $G_1$ and $G_2$, such as that of FIG. 10 described below. Step 3 of FIG. 6 may be referred to herein as a general step, and includes the following operations:

(a) Each node $N_i^1$ of the sub-group of group $G^1$ that received a descriptor from origin node $N_0$ opens k concurrent network connections to all k nodes of group $G^2$ for transferring its descriptor $D_i$ that it received from origin node $N_0$. In this way, at the end of this step, each node of group $G^2$ has all descriptors $D_1, \ldots, D_m$ of MDC file F. This step is represented by communication path(s) 605 to box $G^2$ in FIG. 6. The communications between the nodes in groups $G^1$ and $G^2$ are shown in more detail in FIG. 7. Turning briefly to FIG. 7, it can be seen that node $N_1^1$ of group $G^1$ distributes the descriptor that it originally received from origin node $N_0$ (i.e., descriptor $D_1$) to each of nodes $N_1^2, \ldots, N_k^2$ of group $G^2$ via concurrent communication connections therewith. Similarly, node $N_i^1$ of group $G^1$ distributes the descriptor that it originally received from origin node $N_0$ (i.e., descriptor $D_i$) to each of nodes $N_1^2, \ldots, N_k^2$ of group $G^2$ via concurrent communication connections therewith. Likewise, node $N_m^1$ of group $G^1$ distributes the descriptor that it originally received from origin node $N_0$ (i.e., descriptor $D_m$) to each of nodes $N_1^2, \ldots, N_k^2$ of group $G^2$ via concurrent communication connections therewith. Because of the manner in which each node $N_i^1$ of group $G^1$ opens k concurrent network connections to all k nodes of group $G^2$ for transferring its descriptor $D_i$, this scaled distribution technique may be referred to as a "group-to-group" distribution technique. That is, because the nodes of a first group each communicate the respective descriptor that they received from origin node $N_0$ to each of the nodes of a second group, the MDC file F is distributed directly from the first group to the second group without requiring exchange of information between the nodes of the second group. That is, the nodes of the second group $G^2$ are not required to perform a collection step.

(b) Also in logical step 3 of FIG. 6, in group $G^5$, each node $N_i^5$ to which the origin node $N_0$ sent a descriptor communicates its descriptor $D_i$ to the rest of the nodes in group $G^5$. In this way, at the end of this step, each node in group $G^5$ has all descriptors $D_1, \ldots, D_m$ of MDC file F. This step is represented by communication path(s) 606 to box $G^5$ (collection) in FIG. 6.

(c) At the same logical step 3 of FIG. 6, origin node $N_0$ opens m concurrent network connections to nodes $N_1^7, \ldots, N_m^7$ of group $G^7$, wherein m corresponds to the number of descriptors of MDC file F and wherein m is less than or equal to k. As with the example of FIG. 4A above, the origin node communicates descriptor $D_i$ to the corresponding recipient node $N_i^7 (1 \le i \le m)$, such that the origin node distributes descriptors to a sub-group of m recipient nodes. This step is represented by communication path(s) 604 to box $G^7$ (distribution) in FIG. 6.

Next, logical step 4 is performed in this scaled distribution example of FIG. 6. Step 4 comprises the following operations:

(a) In group $G^2$, each node $N_i^2$ ($1 \leq i \leq m$) opens k concurrent network connections to all k nodes of group $G^3$ for transferring descriptor $D_i$ to each node of group $G^3$. That is, m nodes of group $G^2$ are used to send descriptors $D_1, \ldots, D_m$ to all k nodes in group $G^3$ (in a manner as described above with FIG. 7). Thus at the end of this step, each node in group $G^3$ has all descriptors $D_1, \ldots, D_m$ of MDC file F. This step is represented by communication path(s) 609 to box $G^3$ in FIG. 6.

(b) In group $G^1$, each node $N_i^1$ ($1 \leq i \leq m$) opens k concurrent network connections to all k nodes of group $G^4$ for transferring descriptor $D_i$ to each node of group $G^4$. That is, m nodes of group $G^1$ are used to send descriptors $D_1, \ldots, D_m$ to all k nodes in group $G^4$ (in a manner as described above with FIG. 7). Thus at the end of this step, each node in group $G^4$ has all descriptors $D_1, \ldots, D_m$ of MDC file F. This step is represented by communication path(s) 608 to box $G^4$ in FIG. 6.

(c) In group $G^5$, each node $N_i^5$ ($1 \leq i \leq m$) opens k concurrent network connections to all k nodes of group $G^6$ for transferring descriptor $D_i$ to each node of group $G^6$. That is, m nodes of group $G^5$ are used to send descriptors $D_1, \ldots, D_m$ to all k nodes in group $G^6$ (in a manner as described above with FIG. 7). Thus at the end of this step, each node in group $G^6$ has all descriptors $D_1, \ldots, D_m$ of MDC file F. This step is represented by communication path(s) 610 to box $G^6$ in FIG. 6.

(d) In the same logical step 4, in the group $G^7$, each node $N_i^7$ to which the origin node $N_0$ sent a descriptor communicates its descriptor $D_i$ to the rest of the nodes in group $G^7$. In this way, at the end of this step, each node in group $G^7$ has all descriptors $D_1, \ldots, D_m$ of MDC file F. This step is represented by communication path(s) 607 to box $G^7$(collection) in FIG. 6, and is analogous to the collection step described above in FIGS. 4B-4C with the FastReplica in the Small algorithm.

A relatively simple induction rule defines the number of nodes to which the MDC file F can be replicated in 4 logical steps (such as the 4 logical steps of FIG. 6) in this first scalable distribution algorithm: $k \times (2^2 + 2^1 + 2^0)$, which is graphically shown in FIG. 8.

The example considered above with FIG. 6 can be generalized to the arbitrary number of algorithm steps i, where $i \geq 2$. The number of nodes to which MDC file F can be replicated in i algorithm steps is defined by the following formula:

$$k \times \sum_{j=2}^{i} 2^{i-j}.$$

From this binary representation, the rules for constructing the corresponding distribution lists of nodes are straightforward. Once the nodes to be included in a distribution list are determined, constructing such distribution lists may be performed in accordance with techniques well known in the art. That is, it is within the skill of those in the art to construct such a distribution list, and therefore the technical details of the distribution lists construction is not elaborated on further herein so as not to detract from the inventive features described herein for distributing an MDC file from an origin node to a plurality of recipient nodes.

This first example scaling technique for the above-described FastReplica algorithm is based on the reasoning described above. Consider the problem of replicating MDC file F across nodes $N_1, \ldots, N_n$ and $$\text{let } \frac{n}{k} = q.$$

Then, all of the nodes may be partitioned into q groups: $G^1, G^2, \ldots, G^q$, where each group has k nodes. Any number q can be represented as $q = 2^{i_1} + 2^{i_2} + \ldots + 2^{i_j}$ (referred to herein as "Equation 1"), where $i_1 > i_2 > \ldots > i_j \geq 0$. Practically, this provides a binary representation of a number q. Then schematically, the above-described scalable FastReplica algorithm replicates file F to corresponding groups $G^1, G^2, \ldots, G^q$ in $i_1 + 2$ steps as graphically shown in FIG. 9.

Figure 9:
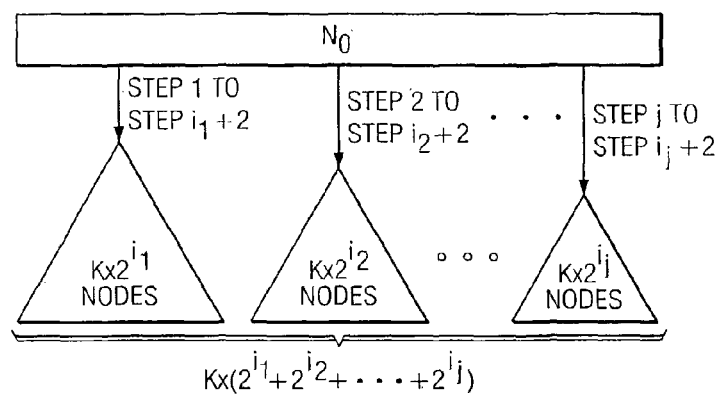
FIG. 9 shows a graphical representation of the number of recipient nodes to which an MDC file F can be replicated in j logical steps in accordance with the first scalable file distribution process of FIG. 6.

If the targeted number n of nodes for a file replication is not a multiple of k, i.e., $$\frac{n}{k} = q + r,$$

where $r < k$, then there is one "incomplete" group G' with r nodes in it. A preferred way to deal with this group in this first scaling technique is to arrange it to be a leaf-group in the biggest sub-tree (i.e., the sub-tree having the longest path from node $N_0$), which replicates the MDC file to $2^{i_1}$ groups as shown in FIG. 9, e.g., group G' is assigned group number $2^{i_1}$.

As an example, let k=10 and let the number of descriptors m of MDC file F be no more than 10 (i.e., $m \leq k$). How many algorithm steps are used in the example scalable FastReplica algorithm described above to replicate the MDC file F to 1000 nodes? Using Equation 1 above, the following representation for 1000 nodes is derived: $1000 = 10 \times (2^6 + 2^5 + 2^2)$. Thus, in 8 algorithm steps, the MDC file F will be replicated among all 1000 nodes.

From the above, it should be recognized that this first scaling technique results in a relatively narrow scaling tree (such as the example scaling tree of FIG. 6). That is, the overall length of the sub-tree paths from node $N_0$ is relatively long as compared to the width of the tree (i.e., the number of groups at each level of the tree). Generally, a wider scaling tree is desired for greater efficiency.

A scaling technique for providing a wider scaling tree that may be implemented with embodiments of the present invention is described in co-pending and commonly assigned U.S. patent application Ser. No. 10/345,718, titled "SYSTEM AND METHOD FOR EFFICIENTLY REPLICATING A FILE AMONG A PLURALITY OF RECIPIENTS HAVING IMPROVED SCALABILITY", the disclosure of which has been incorporated herein by reference. Such a scaling technique that results in a wider scaling tree in many distribution environments than that of the first scaling technique, which may be used with file distribution techniques of embodiments of the present invention, such as the above-described FastReplica distribution technique, is described below in conjunction with FIGS. 10-11.

Considering this second scaling technique, let k be a number of network connections chosen for concurrent transfers between a single node and multiple receiving nodes (i.e., k limits the number of nodes in the group for the above-described FastReplica strategy). A natural way to scale the above-described FastReplica in the Small algorithm to a large number of recipient nodes is:

(a) partition the original set of nodes into replication groups, each consisting of k nodes; and
(b) apply FastReplica in the small iteratively: first, replicate the MDC file F to a first group of k nodes, and then use these k nodes of the first group as origin nodes with MDC file F to repeat the same distribution procedure to further groups of nodes.

Figure 10:
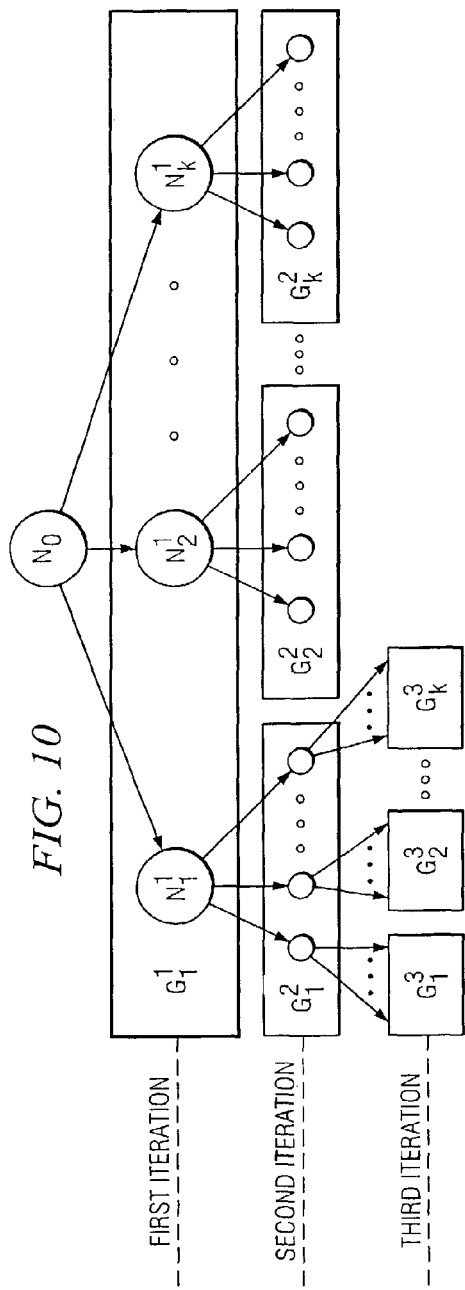
FIG. 10 shows a second example scaling technique for a file distribution process of an embodiment of the present invention.

Schematically, this procedure is shown in FIG. 10 where circles represent nodes, and boxes represent replication groups. The arrows, connecting one node with a set of other nodes, reflect the origin node and the recipient nodes involved in communications on a particular iteration of this second distribution algorithm.

At the first iteration shown in the example of FIG. 10, origin node $N_0$ replicates MDC file F to a first group $G_1^1$ having k nodes (i.e., nodes $N_1^1, N_2^1, \ldots, N_k^1$) using the above-described FastReplica in the Small algorithm. For instance, a replication technique such as that described with FIGS. 1-3 above may be used (e.g., if the number m of descriptors of MDC file F is equal to the number k of recipient nodes in the group), a replication technique such as that described with FIGS. 4A-4C above may be used (e.g., if the number m of descriptors of MDC file F is less than the number k of recipient nodes in the group). Thus, in the first iteration, origin node $N_0$ distributes a plurality of descriptors of MDC file F to at least a portion of nodes $N_1^1, N_2^1, \ldots, N_k^1$ of first group $G_1^1$, and then the recipient nodes that received a descriptor from origin node $N_0$ further communicate their respective descriptors to the others of nodes $N_1^1, N_2^1, \ldots, N_k^1$ (i.e., perform a collection step) such that all of the recipient nodes of the first group $G_1^1$ obtain all descriptors of MDC file F. Such first group $G_1^1$ may be referred to herein as a first-level group of nodes.

At the second iteration, each node $N_i^1 (1 \leq i \leq k)$ of group $G_1^1$ can serve as an origin node propagating MDC file F to the nodes of other groups $G_1^2, G_2^2, \ldots, G_k^2$. Such groups $G_1^2, G_2^2, \ldots, G_k^2$ may be referred to herein as second-level groups of nodes. For instance, node $N_1^1$ of first-level group $G_1^1$ distributes the descriptors of MDC file F to the recipient nodes of second-level group $G_1^2$ in a manner similar to that described above in FIG. 1 or FIG. 4A for origin node $N_0$ communicating descriptors to recipient nodes. In other words, node $N_1^1$ of first-level group $G_1^1$ performs a distribution step to distribute a plurality of descriptors of MDC file F to at least a portion of the recipient nodes of second-level group $G_1^2$. Thereafter, the recipient nodes that received a descriptor from acting origin node $N_1^1$ further communicate their respective descriptors to the other nodes of group $G_1^2$ (i.e., perform a collection step) such that all of the recipient nodes of group $G_1^2$ obtain all descriptors of MDC file F.

Similarly, each other node $N_1^2, \ldots, N_k^2$ of first-level group $G_1^1$ may concurrently (in iteration 2) distribute MDC file F to second level groups $G_2^2, \ldots, G_k^2$, respectively, in a similar manner to that described above for distribution from node $N_1^1$ to group $G_1^2$ (e.g., using the above-described FastReplica distribution technique). This distribution technique may be referred to herein as an iterative "one-to-many" distribution technique, as each node of each group at each level may act as an origin node to distribute MDC file F to many nodes comprising a group at a next level.

In view of the above, in two iterations, MDC file F can be replicated to k×k nodes using this iterative one-to-many distribution technique. Correspondingly, in three iterations, MDC file F can be replicated to k×k×k nodes, and so on. As an example of grouping the recipient nodes, suppose it is desired to replicate file F across nodes $N_1, \ldots, N_n$ and $$\text{let } \frac{n}{k} = q.$$

Then all of the nodes may be partitioned into q groups: $G^1, G^2, \ldots, G^q$, where each group has k nodes. Any number q can be represented in this second scaling technique as: $q = c_1 \times k^{i_1} + c_2 \times k^{i_2} + \ldots + c_j \times k^{i_j}$ (referred to herein as "Equation 2"), where $i_1 > i_2 > \ldots > i_j \geq 0$ and $0 < c_1, \ldots, c_j < k$, and wherein "c" is an integer coefficient. Practically, this provides a k-ary representation of a number q. This representation defines the rules for constructing the tree structure similar to the one shown in FIG. 10. In particular, the height of such a tree is $i_1 + 1$, and it defines the number of iterations using the second scaled distribution technique described above.

From this k-ary representation, the rules for constructing the corresponding distribution lists of nodes are straightforward. Once the nodes to be included in a distribution list are determined, constructing such distribution lists may be performed in accordance with techniques well known in the art. That is, it is within the skill of those in the art to construct such a distribution list, and therefore the technical details of the distribution lists construction is not elaborated on further herein so as not to detract from the inventive features described herein for distributing an MDC file from an origin node to a plurality of recipient nodes.

If the targeted number n of nodes for a file replication is not a multiple of k, i.e., $$\frac{n}{k} = q + r,$$

where r<k, then there is one "incomplete" group $\hat{G}$ with r nodes in it. A preferred way to deal with this group when using this second scaling algorithm is to arrange it to be a leaf-group in the shortest subtree. So, assuming for instance that such an incomplete group exists in the example of FIG. 10, it would be arranged in the third level of the distribution tree such that group $G_2^2$ of the second level would act as complete group G' of FIG. 11 for communicating the subfiles to the nodes of the incomplete group $\hat{G}$.

Figure 11:
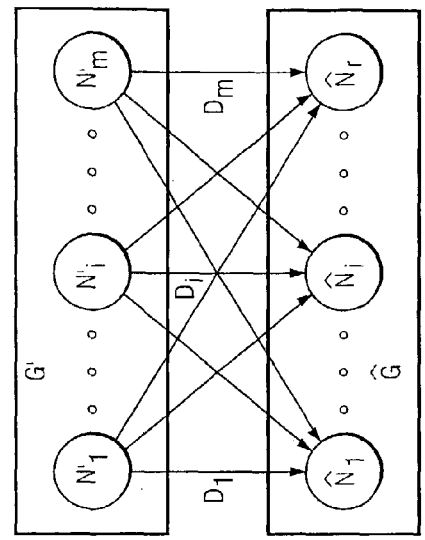
FIG. 11 shows communication paths between a complete group of nodes and an incomplete group of nodes in the example second scaled distribution process of FIG. 10.

For example, let $G' = \{N_1', \ldots, N_k'\}$ be a complete replication group in the shortest subtree. Further, let incomplete group $\hat{G} = \{\hat{N}_1, \ldots \hat{N}_r\}$ where r<k. The communications between groups G' and $\hat{G}$ may follow a slightly different file exchange protocol than that described above in FIG. 10 for communicating MDC file F from a node of one group to the nodes of another group. Suppose that all of the nodes in G' have already received all descriptors $D_1, \ldots, D_m$ of MDC file F (e.g., when performing iteration 2 in FIG. 10, all of the nodes of group $G_1^1$ have received all of descriptors $D_1, \ldots, D_m$ of MDC file F, as such descriptors were received in the first iteration). As shown in FIG. 11, each node $N_i'$ of a sub-group of m nodes of complete group G' opens r concurrent network connections to all r nodes of group G' for transferring its respective descriptor $D_i$. In this way, at the end of this step, each node of group $\hat{G}$ has all descriptors $D_1, \ldots, D_m$ of MDC file F. This step may be referred to herein as a special step. It should be recognized that this special step corresponds to the "group-to-group" type of distribution utilized in the first scaling technique described above. Thus, in certain implementations, if a group of recipient nodes is not complete (i.e., does not have k nodes), then the group-to-group distribution technique of the first example scaled distribution may be utilized for communicating the MDC file F to such incomplete group. Accordingly, in certain embodiments, a hybrid of the first example scaling technique described above and the second example scaling technique described above may be utilized. More particularly, both the above-described group-to-group distribution technique and the above-described one-to-many distribution technique may be employed in certain implementations of the scaled distribution algorithm. For instance, the one-to-many distribution technique may be used for all complete groups having k nodes, and the group-to-group distribution technique may be used for any incomplete group that has less than k nodes.

As an example, let k=10 (i.e., 10 concurrent communication connections are determined to be suitable for use between the nodes) and let the number of descriptors m of MDC file F be no more than 10 (i.e., m≤k). How many algorithm iterations are required to replicate the MDC file F to 1000 nodes using the second scaled distribution technique described above? Using Equation 2 above, the following representation for 1000 nodes can be derived: $1000=10\times10^2$. Thus, in three algorithm iterations (10×10×10), the original file F can be replicated among all 1000 nodes. At each iteration, the replication process follows the above-described FastReplica in the Small distribution technique, i.e., each iteration has 2 steps (a distribution step and a collection step).

Taking into account the nature of MDC (i.e., that any description received by the recipient node can be used to decode the baseline quality video), the reliability of the scaled FastReplica algorithm may be enhanced when distributing MDC files. For instance, when using the first scaling technique described above for distributing a media file encoded with MDC, even if failed nodes exist in the distribution tree, this first scaled FastReplica technique may provide a suitable distribution technique because receipt by nodes below the failed node(s) in the distribution tree of a portion of the descriptions (from the working nodes of the higher level) will be enough to decode a baseline quality file. That is, when using a group-to-group distribution technique, if one of the nodes in a first group responsible for distributing a particular descriptor to the nodes of a second group fails, then the nodes of the second group will not receive this particular descriptor. However, the nodes of the second group will still receive the descriptors from the working nodes of the first group, and with MDC encoding, such portion of the total number of descriptors is sufficient to enable the nodes of the second group to decode the MDC file. Thus, service providers also may determine which of the above-described scaling techniques of FastReplica to utilize based on the content reliability requirements.

Furthermore, in certain embodiments, techniques may be implemented for improving the reliability of the distribution technique in the event that one or more recipient nodes fail. That is, techniques may be implemented for improving the distribution technique in a manner that ensures non-failed nodes receive as many descriptors as possible (to ensure that a high-quality version of the MDC file is received by the non-failed nodes). Example techniques for improving the reliability of the first scalable distribution algorithm described above (with FIGS. 6-9) to account for failed nodes that may be implemented with embodiments of the present invention are disclosed in co-pending and commonly assigned U.S. patent application Ser. No. 10/345,587, titled "SYSTEM AND METHOD FOR EFFICIENTLY REPLICATING A FILE AMONG A PLURALITY OF RECIPIENTS IN A RELIABLE MANNER", the disclosure of which has been incorporated herein by reference. Further, example techniques for improving the reliability of the second scalable distribution algorithm described above (with FIGS. 10-11) to account for failed nodes may be implemented with embodiments of the present invention are disclosed in co-pending and commonly assigned U.S. patent application Ser. No. 10/345,719, titled "SYSTEM AND METHOD FOR EFFICIENTLY REPLICATING A FILE AMONG A PLURALITY OF RECIPIENTS HAVING IMPROVED SCALABILITY AND RELIABILITY", the disclosure of which has been incorporated herein by reference.

Figure 12B:
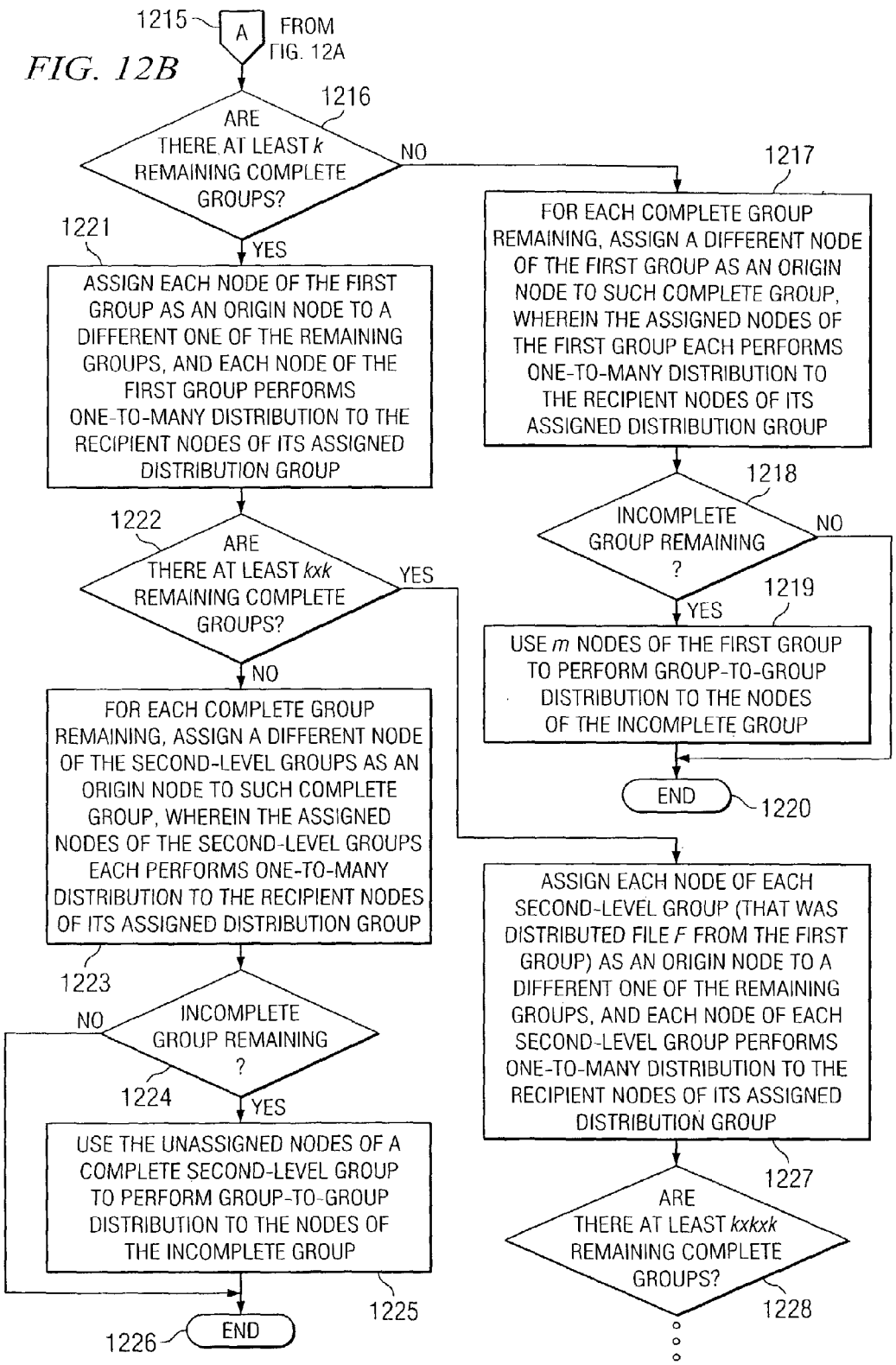

As mentioned briefly above, in certain implementations the first and second scaling techniques of FastReplica may be combined in a hybrid strategy to result in using an optimal size distribution tree. Turning to FIGS. 12A-12B, an example operational flow diagram for distributing an MDC file to a plurality of recipient nodes in a scalable fashion in accordance with an embodiment of the present invention is shown. As shown in FIG. 12A, operation of this example embodiment starts with operational block 1201, whereat a suitable number k of communication connections that can be concurrently established from any one of a plurality of nodes $N_1$, $N_2$, ..., $N_n$ to which an MDC file F is to be distributed to any other of the plurality of nodes is determined. In operational block 1202 it is determined whether k is less than the total number n of recipient nodes to which file F is to be distributed. If k is not less than the total number n of recipient nodes, then operation advances to block 1203 whereat all n of the recipient nodes are grouped into a first group of nodes. Then, in operational block 1204, k is set equal to n. That is, the number of concurrent communication connections that is established from any one of the nodes during distribution is set to n. Operation then advances from block 1204 to operational block 1210, which is described further below.

If, at operational block 1202, it is determined that k is less than the total number n of recipient nodes, then operation advances to block 1205 whereat the first k number of recipient nodes $N_1$, $N_2$, ..., $N_n$ (i.e., nodes $N_1$, $N_2$, ..., $N_k$) are grouped into a first group of nodes. Then, in operational block 1206 it is determined whether at least k recipient nodes remain ungrouped. If there are fewer than k recipient nodes remaining to be grouped, then operation advances to block 1207 whereat the remaining r recipient nodes (r<k) are grouped to an incomplete group G. Operation then advances from block 1207 to operational block 1210, which is described further below.

If, at operational block 1206, it is determined that at least k recipient nodes remain ungrouped, operation advances to block 1208 whereat the next k number of recipient nodes are grouped into a next group. Then, in operational block 1209, it is determined whether any recipient nodes remain ungrouped. If more recipient nodes do remain ungrouped, then operation returns to block 1206 to continue the logical grouping of the recipient nodes. If it is determined at operational block 1209 that no further recipient nodes remain ungrouped, then operation advances to block 1210.

At operational block 1210, m concurrent communication connections are established from origin node $N_0$ to a sub-group of m recipient nodes of the first group of nodes, wherein m is the number of descriptors of MDC file F and is no greater than k (i.e., m≤k). That is, origin node $N_0$ may determine the number m of descriptors of MDC file F and may logically group m recipient nodes of the first group into a sub-group, and origin node $N_0$ may establish concurrent communication connections with the m recipient nodes of such sub-group. In operational block 1211, the distribution step is performed in which origin node $N_0$ communicates all of the m descriptors of MDC file F to the sub-group of recipient nodes of the first group, wherein each recipient node of the sub-group receives a different descriptor (as in the distribution step of the example of FIG. 4A described above). Then, in operational block 1212, the collection step is performed in which the sub-group of recipient nodes of the first group each communicate its respective descriptor to the other nodes of the first group such that each recipient node of the first group obtains all m descriptors of file F (as in the collection step of the example of FIGS. 4B-4C described above). Preferably, each node of the sub-group establishes k−1 concurrent communication connections with the other of nodes $N_1, N_2, \ldots, N_k$ to communicate the descriptor that it received from origin node $N_0$ in block 1211 to those other nodes concurrently.

In operational block 1213, it is determined whether further groups remain to have MDC file F distributed thereto. If no such further groups remain, then operation ends in block 1214. However, if further groups do remain, then operation continues to FIG. 12B (as shown with linking block A 1215).

As shown in FIG. 12B, at operational block 1216 it is determined whether at least k complete groups remain to have MDC file F distributed thereto. If not, then operation advances to block 1217. In block 1217, for each complete group remaining, a different node of the first group is assigned as an origin node to such complete group, wherein the assigned nodes of the first group each performs a one-to-many distribution to the recipient nodes of its assigned distribution group (and the nodes within each recipient group perform a collection step to obtain all of the descriptors of MDC file F), as discussed above with FIG. 10. In operational block 1218, it is determined whether an incomplete group $\hat{G}$ remains to have MDC file F distributed thereto. If not, then operation ends in block 1220. If such an incomplete group $\hat{G}$ does remain, then operation advances to block 1219 whereat m nodes of the first group are then used to perform group-to-group distribution to the nodes of the incomplete group $\hat{G}$, as discussed above with FIG. 11. Then, operation ends in block 1220.

If at operational block 1216, it is determined that at least k complete groups do remain to have MDC file F distributed thereto, then operation advances to block 1221. At block 1221, each node of the first group is assigned as an origin node to a different one of the remaining complete groups, wherein each node of the first group performs a one-to-many distribution to the recipient nodes of its assigned distribution group (and the nodes within each recipient group perform a collection step to obtain all of the descriptors of MDC file F), as discussed above with FIG. 10. Operation then advances to block 1222 whereat it is determined whether at least k×k complete groups remain to have MDC file F distributed thereto. If not, then operation advances to block 1223. In block 1223, for each complete group remaining, a different node of the second-level groups is assigned as an origin node to such complete group, wherein the assigned nodes of the second-level groups each performs a one-to-many distribution to the recipient nodes of its assigned distribution group (and the nodes within each recipient group perform a collection step to obtain all of the descriptors of MDC file F), as discussed above with FIG. 10. In operational block 1224, it is determined whether an incomplete group $\hat{G}$ remains to have MDC file F distributed thereto. If not, then operation ends in block 1226. If such an incomplete group $\hat{G}$ does remain, then operation advances to block 1225 whereat the unassigned nodes of a complete second-level group are used to perform group-to-group distribution to the nodes of the incomplete group $\hat{G}$. For instance, as described above, such incomplete group $\hat{G}$ may be logically arranged from the shortest sub-tree (i.e., coupled to a group of the second-level that does not have a distribution group assigned thereto), and m nodes of the complete second-level group of the shortest sub-tree are used to perform group-to-group distribution to the nodes of the incomplete group $\hat{G}$, as discussed above with FIG. 11. Then, operation ends in block 1226.

If, at operational block 1222, it is determined that at least k×k complete groups do remain to have file F distributed thereto, then operation advances to block 1227. At block 1227, each node of each second-level group is assigned as an origin node to a different one of the remaining complete groups, wherein each node of each second-level group performs a one-to-many distribution to the recipient nodes of its assigned distribution group (and the nodes within each recipient group perform a collection step to obtain all of the descriptors of MDC file F), as discussed above with FIG. 10. Operation then advances to block 1228 whereat it is determined whether at least k×k×k complete groups remain to have MDC file F distributed thereto, and operation may continue in a manner similar to that described in blocks 1222-1227 until MDC file F is distributed to all n of the nodes to which it is to be distributed.

In view of the above, the example of FIGS. 12A-12B provide an implementation of a scalable distribution technique that may use both group-to-group distribution (e.g., for incomplete groups) and one-to-many distribution. Of course, various other scalable distribution techniques may be utilized in accordance with the distribution techniques described herein, and any such scalable distribution techniques are intended to be within the scope of the present invention.

It should be recognized that while recipient nodes are referred to above as being logically grouped into groups or sub-groups, such logical groupings may exist only for distribution of an MDC file F in certain embodiments. That is, the recipient nodes need not be so logically grouped for any other purposes, and the recipient nodes may be grouped differently for different file distributions. For instance, different distributions (of other MDC files at other times) may comprise different logical groupings of the recipient nodes.

Various elements for performing the above-described file distribution functions of embodiments of the present invention may be implemented in software, hardware, firmware, or a combination thereof. For example, software may be used on an origin node No for determining logical groupings of recipient nodes. As another example, network interfaces may be used to concurrently communicate descriptors of an MDC file from an origin node to recipient nodes of a distribution group (e.g., in the distribution step of FastReplica), as well as for communication of such descriptors between recipient nodes of the distribution group (e.g., in the collection step of FastReplica).

When implemented via computer-executable instructions, various elements of embodiments of the present invention for distributing MDC file F from an origin node to recipient nodes are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media can include any medium that can store or transfer information.

What is claimed is:

1. A method of distributing from a first node to a plurality of recipient nodes a file encoded with multiple description coding, the method comprising:

distributing a plurality of descriptors of a file encoded with multiple description coding (MDC) from a first node to a plurality of nodes of a first group of a plurality of different groups, the plurality of different groups comprising different nodes in different groups;

wherein at least one descriptor is distributed from the first node directly to each of the plurality of nodes of said first group but not all of said plurality of descriptors are distributed from the first node directly to any of the plurality of nodes of said first group;

said plurality of nodes of said first group exchanging their respective descriptors such that each of the plurality of nodes of said first group obtains all of said plurality of descriptors;

said plurality of nodes of the first group communicating said plurality of descriptors to a plurality of nodes of a second group, of the plurality of groups, comprising a different plurality of recipient nodes;

determining the number of descriptors of said file; and determining the number of said plurality of nodes to include in said first group as corresponding to the number of descriptors of said file.

2. The method of claim 1 wherein said distributing comprising:
distributing a different descriptor to each of said plurality of nodes of said first group.

3. The method of claim 1 further comprising:
determining a number of said plurality of nodes to include in said first group.

4. The method of claim 1 wherein said distributing comprises:
distributing the plurality of descriptors to said plurality of nodes of said first group concurrently.

5. The method of claim 1 wherein said distributing comprises:
distributing the plurality of descriptors via a communication network to which said first node and said plurality of nodes of said first group are communicatively coupled.

6. The method of claim 5 wherein said distributing comprises:
distributing the plurality of descriptors to said plurality of nodes of said first group via concurrent communication connections of said first node to said communication network.

7. The method of claim 1 wherein said plurality of nodes of said first group exchanging their respective descriptors further comprises:
each of said plurality of nodes establishing concurrent communication connections to every other node of said first group.

8. The method of claim 1 wherein each of said first node and said plurality of nodes of said first group comprise a server computer.

9. The method of claim 8 wherein said first node and said plurality of nodes of said first group are distributed server computers in a Content Distribution Network (CDN).

10. The method of claim 1 further comprising:
each of the plurality of nodes of said first group communicating a descriptor of said file to each of the plurality of nodes of said second group such that said plurality of nodes of said second group each receive all of said plurality of descriptors of said file.

11. The method of claim 1 further comprising:
each of the plurality of nodes of said first group communicating the descriptor that it received from said first node to every node of the second group.

12. The method of claim 11 wherein each of the plurality of nodes of said first group communicates the descriptor that it received from said first node to every node of the second group concurrently.

13. The method of claim 1 wherein said plurality of nodes of the first group communicating said plurality of descriptors to the plurality of nodes of said second group further comprises:
communicating the plurality of descriptors of said file from at least one node of said first group to the plurality of nodes of said second group, wherein at least one descriptor is communicated from the at least one node to each of the plurality of nodes of said second group but not all of said plurality of descriptors are distributed from the at least one node to any of the plurality of nodes of said second group; and said plurality of nodes of said second group exchanging their respective descriptors such that each of the plurality of nodes of said second group obtains all of said plurality of descriptors.

14. The method of claim 13 wherein said communicating the plurality of descriptors from said at least one node of said first group to the plurality of nodes of said second group comprises:
communicating the plurality of descriptors to the plurality of nodes of said second group concurrently.

15. A method of distributing from a first node to a plurality of recipient nodes a file encoded with multiple description coding, the method comprising:
distributing a plurality of descriptors of a file encoded with multiple description coding (MDC) from a first node to at least a portion of a plurality of nodes of a first group of a plurality of different groups, the plurality of different groups comprising different nodes in different groups;

wherein at least one descriptor is distributed from the first node directly to each recipient node of said at least a portion of said first group;

said at least a portion of said first group communicating their respective descriptors received directly from said first node directly to other nodes of said first group;

said recipient nodes of the first group communicating said plurality of descriptors to a plurality of nodes of a second group, of the plurality of groups, comprising a different plurality of recipient nodes;

determining the number of descriptors of said file; and determining the number of said recipient nodes to include in said sub-group as corresponding to the number of descriptors of said file.

16. The method of claim 15 wherein not all of said plurality of descriptors are distributed from the first node to any of the recipient nodes of said first group.

17. The method of claim 15 wherein said distributing comprises:
distributing a different descriptor to each of said at least a portion of said first group of recipient nodes.

18. The method of claim 15 wherein said at least a portion of said first group of recipient nodes comprises a sub-group of said first group of recipient nodes, said sub-group comprising multiple ones of said plurality of recipient nodes of said first group.

19. The method of claim 18 further comprising:
determining a number of said recipient nodes to include in said sub-group.

20. The method of claim 18 wherein said distributing comprises:
distributing the plurality of descriptors to said multiple recipient nodes of said sub-group concurrently.

21. The method of claim 18 wherein said at least a portion of said first group communicating their respective descriptors received from said first node to other nodes of said first group comprises:
each of said multiple recipient nodes of said sub-group establishing concurrent communication connections to every other recipient node of said first group.

22. A system comprising:
an origin node comprising a processor, wherein the origin node distributes all of a plurality of descriptors of a file encoded with multiple description coding (MDC) from said origin node to a plurality of nodes of a first group of a plurality of different groups, the plurality of different groups comprising different nodes in different groups;
wherein at least one descriptor is distributed from the origin node directly to each recipient node of said first group but not all of said plurality of descriptors are distributed from the origin node directly to any of the recipient nodes of said first group;
wherein said recipient nodes of said first group communicate their respective descriptors received from the origin node directly with the recipient nodes of said first group such that each recipient node of said first group obtains all of said plurality of descriptors;
a second group of different recipient nodes, wherein each of said recipient nodes of said first group communicates its respective descriptors received from the origin node with the recipient nodes of said second group;
wherein said origin node
determines the number of descriptors of said MDC file; and
determines a number of recipient nodes to include in said first group as corresponding in number to the number of descriptors of the MDC file.

23. The system of claim 22 wherein said first group of recipient nodes comprise a number of recipient nodes equal to the number of descriptors of the MDC file.

24. The system of claim 22 wherein the origin node distributes a different descriptor to each of said recipient nodes of said first group.

25. The system of claim 22 wherein the origin node concurrently distributes one of the plurality of descriptors to each of said plurality of recipient nodes of said first group.

26. The system of claim 22 comprising:
a communication network to which said origin node and said plurality of recipient nodes of said first group are communicatively coupled.

27. The system of claim 26 wherein the origin node establishes concurrent communication connections from said origin node to said plurality of recipient nodes of said first group.

28. The system of claim 22 wherein said first group establishes concurrent communication connections from the recipient node to every other recipient node of said first group.

29. A system comprising:
an origin node comprising a processor, operable to distribute all of a plurality of descriptors of a file encoded with multiple description coding (MDC) to a plurality of nodes in a first group of a plurality of different groups, the plurality of different groups comprising different nodes in different groups;
wherein said origin node does not attempt to communicate all of said plurality of descriptors to all of said recipient nodes of said first group; and
wherein said recipient nodes of said first group are each operable to communicate a descriptor that it directly receives from said origin node directly to other nodes of said first group; and
a second group of different recipient nodes, wherein each of said recipient nodes of said first group communicates its respective descriptors received from the origin node with the recipient nodes of said second group;
wherein said origin node is operable to logically group a number of said recipient nodes of said first group into a sub-group, wherein said number of said recipient nodes of said sub-group corresponds to the number of descriptors of the MDC file.

30. The system of claim 29 wherein said origin node is operable to distribute said plurality of descriptors to a sub-group of said first group of recipient nodes, and wherein said sub-group of recipient nodes are operable to communicate the plurality of descriptors to the nodes of said first group that are not included in said sub-group.

31. The system of claim 29 wherein said origin node is operable to concurrently distribute one of the plurality of descriptors to each of the recipient nodes of said sub-group.

32. The system of claim 31 wherein said origin node is operable to concurrently distribute a different one of said plurality of descriptors to each of said recipient nodes of said sub-group.

33. The system of claim 29 wherein said origin node is operable to distribute a different one of said plurality of descriptors to each of said recipient nodes of said sub-group.

34. The system of claim 33 wherein each of said recipient nodes of said sub-group is operable to communicate its respective descriptor received from said origin node to each of the other recipient nodes of said sub-group.

35. The system of claim 33 wherein each of said recipient nodes of said sub-group is operable to communicate a respective descriptor received from said origin node to each of the other recipient nodes of said first group.

36. A system comprising:
an origin node comprising a processor, to distribute all of a plurality of descriptors of a file encoded with multiple description coding (MDC) from said origin node to at least a sub-group of a first group of a plurality of groups, the sub-group having more than one node, the plurality of different groups comprising different nodes in different groups;
wherein at least one descriptor is distributed from the origin node directly to each recipient node of said sub-group of said first group; and
the recipient nodes of said sub-group each to communicate its respective descriptors received from said origin node directly to other nodes of said first group; and
a second group of different recipient nodes, wherein each of said recipient nodes of said sub-group communicate its respective descriptors received from the origin node with the recipient nodes of said second group;
wherein said origin node
determines the number of descriptors of said MDC file; and
determines a number of recipient nodes to include in said sub-group as corresponding in number to the number of descriptors of the MDC file.

37. The system of claim 36 wherein said recipient nodes of said sub-group each exchange its respective descriptors received from said origin node such that each recipient node of said sub-group obtains all of said plurality of descriptors of said file.

38. The system of claim 36 wherein said origin node:
concurrently distributes one of said plurality of descriptors to each of said sub-group of recipient nodes.

* * * * *